US011332591B2

(12) United States Patent
Hermann et al.

(10) Patent No.: US 11,332,591 B2
(45) Date of Patent: May 17, 2022

(54) PRODUCTION OF PU FOAMS

(71) Applicant: Evonik Operations GmbH, Essen (DE)

(72) Inventors: Daniela Hermann, Düsseldorf (DE); Roland Hubel, Essen (DE); Annegret Terheiden, Alpen (DE); Michael Ferenz, Essen (DE); Wilfried Knott, Essen (DE); Horst Dudzik, Essen (DE)

(73) Assignee: Evonik Operations GmbH, Essen (DE)

( * ) Notice: Subject to any disclaimer, the term of this patent is extended or adjusted under 35 U.S.C. 154(b) by 38 days.

(21) Appl. No.: 15/930,595

(22) Filed: May 13, 2020

(65) Prior Publication Data

US 2020/0377684 A1 Dec. 3, 2020

(30) Foreign Application Priority Data

May 28, 2019 (EP) .................................. 19176877

(51) Int. Cl.
| | | |
|---|---|---|
| *C08J 9/12* | (2006.01) | |
| *C08J 9/00* | (2006.01) | |
| *C09D 7/65* | (2018.01) | |
| *C08L 75/08* | (2006.01) | |
| *C09D 5/00* | (2006.01) | |
| *C09D 175/08* | (2006.01) | |
| *C09J 11/08* | (2006.01) | |
| *C09J 175/08* | (2006.01) | |
| *C09K 3/10* | (2006.01) | |

(52) U.S. Cl.
CPC ............. *C08J 9/0061* (2013.01); *C08J 9/125* (2013.01); *C08L 75/08* (2013.01); *C09D 5/00* (2013.01); *C09D 7/65* (2018.01); *C09D 175/08* (2013.01); *C09J 11/08* (2013.01); *C09J 175/08* (2013.01); *C09K 3/1021* (2013.01); *C08J 2203/10* (2013.01); *C08J 2205/06* (2013.01); *C08J 2375/08* (2013.01); *C08J 2383/12* (2013.01); *C08L 2203/14* (2013.01); *C09K 2200/065* (2013.01); *C09K 2200/0685* (2013.01)

(58) Field of Classification Search
CPC .. C08G 18/18; C08G 18/244; C08G 18/4009; C08G 18/48; C08G 18/4812; C08G 18/4816; C08G 18/4825; C08G 18/4829; C08G 18/61; C08G 18/7621; C08G 18/7664; C08G 18/7671; C08G 77/46; C08G 2101/00; C08G 2110/0008; C08G 2110/005; C08J 9/0061; C08J 9/125; C08J 2203/10; C08J 2205/06; C08J 2375/04; C08J 2375/08; C08J 2383/12; C08J 2483/12; C08L 75/08; C08L 2203/14; C09D 5/00; C09D 7/65; C09D 175/08; C09J 11/08; C09J 175/08; C09K 3/1021; C09K 2200/065; C09K 2200/0685

See application file for complete search history.

(56) References Cited

U.S. PATENT DOCUMENTS

| | | | |
|---|---|---|---|
| 3,346,557 A | 10/1967 | Patton, Jr. et al. | |
| 3,356,758 A | 12/1967 | Omietanski et al. | |
| 3,900,424 A | 8/1975 | Inoue et al. | |
| 3,933,695 A | 1/1976 | Omietanski et al. | |
| 3,953,383 A | 4/1976 | Inoue et al. | |
| 4,025,456 A * | 5/1977 | Litteral .................. | C08G 77/46 |
| | | | 516/13 |
| 4,042,540 A | 8/1977 | Lammerting et al. | |
| 4,147,847 A * | 4/1979 | Schweiger ............. | C08J 9/0061 |
| | | | 521/112 |
| 4,177,201 A | 12/1979 | De Montigny et al. | |
| 4,500,704 A | 2/1985 | Kruper, Jr. et al. | |
| 4,855,378 A | 8/1989 | Budnik et al. | |
| 5,306,737 A | 4/1994 | Burkhart et al. | |
| 5,321,051 A | 6/1994 | Burkhart et al. | |
| 5,357,018 A | 10/1994 | Burkhart et al. | |
| 5,625,024 A * | 4/1997 | Schlitte .............. | B01D 19/0409 |
| | | | 528/29 |
| 5,844,010 A | 12/1998 | Burkhart et al. | |
| 6,359,022 B1 | 3/2002 | Hickey et al. | |

(Continued)

FOREIGN PATENT DOCUMENTS

| | | |
|---|---|---|
| CA | 2008639 A1 | 8/1990 |
| DE | 15 45 110 A1 | 6/1969 |

(Continued)

OTHER PUBLICATIONS

Knott et al., U.S. Appl. No. 17/239,011, filed Apr. 23, 2021.
Fiedel et al., U.S. Appl. No. 16/648,345, filed Mar. 18, 2020.
Knott et al., U.S. Appl. No. 16/759,413, filed Apr. 27, 2020.
Knott et al., U.S. Appl. No. 16/849,013, filed Apr. 15, 2020.
Knott et al., U.S. Appl. No. 16/849,106, filed Apr. 15, 2020.
Knott et al., U.S. Appl. No. 16/849,181, filed Apr. 15, 2020.
Knott et al., U.S. Appl. No. 16/850,198, filed Apr. 16, 2020.
Knott et al., U.S. Appl. No. 16/851,252, filed Apr. 17, 2020.
Knott et al., U.S. Appl. No. 16/851,292, filed Apr. 17, 2020.
Knott et al., U.S. Appl. No. 16/851,385, filed Apr. 17, 2020.
Knott et al., U.S. Appl. No. 17/145,558, filed Jan. 11, 2021.

(Continued)

*Primary Examiner* — John M Cooney

(74) *Attorney, Agent, or Firm* — Taylor English Duma LLP; Philip P. McCann

(57) ABSTRACT

Process for producing PU foams by reacting at least one polyol component with at least one isocyanate component in the presence of one or more catalysts that catalyse the isocyanate-polyol and/or isocyanate-water reactions and/or isocyanate trimerization, and optionally one or more chemical or physical blowing agents, with use of SiOC-bonded polyether siloxanes having branching in the siloxane moiety, prepared from branched siloxanes bearing acetoxy groups, wherein a sufficient amount of the SiOC-bonded polyether siloxane having branching in the siloxane moiety is added that the proportion by mass of this polyether siloxane (e) based on the finished PU foam is from 0.0001% to 10% by weight.

12 Claims, No Drawings

(56) References Cited

U.S. PATENT DOCUMENTS

| | | |
|---|---|---|
| 6,762,274 B2 | 7/2004 | Waddington et al. |
| 6,924,321 B2 | 8/2005 | Casati et al. |
| 7,157,541 B2 | 1/2007 | Knott et al. |
| 7,671,103 B2 | 3/2010 | Eilbracht et al. |
| 7,671,104 B2 | 3/2010 | Heinemann et al. |
| 8,247,467 B2 | 8/2012 | Mijolovic et al. |
| 8,293,808 B2 | 10/2012 | Herrington et al. |
| 9,695,202 B2 | 7/2017 | Henning et al. |
| 9,896,534 B2 | 2/2018 | Lobert et al. |
| 9,896,541 B2 | 2/2018 | Fiedel et al. |
| 9,975,909 B2 | 5/2018 | Schubert et al. |
| 9,982,085 B2 | 5/2018 | Landers et al. |
| 10,087,278 B2 | 10/2018 | Fiedel et al. |
| 10,099,211 B2 | 10/2018 | Knott et al. |
| 10,106,649 B2 | 10/2018 | Fiedel et al. |
| 10,160,832 B2 | 12/2018 | Lobert et al. |
| 10,189,965 B2 | 1/2019 | Krebs et al. |
| 10,287,454 B2 | 5/2019 | Klotzbach et al. |
| 10,299,471 B2 | 5/2019 | Hansel et al. |
| 10,351,687 B2 | 7/2019 | Diendorf et al. |
| 10,399,998 B2 | 9/2019 | Knott et al. |
| 10,407,546 B2 | 9/2019 | Lobert et al. |
| 10,407,592 B2 | 9/2019 | Amajjahe et al. |
| 10,414,871 B2 | 9/2019 | Knott et al. |
| 10,414,872 B2 | 9/2019 | Knott et al. |
| 10,457,769 B2 | 10/2019 | Gunther et al. |
| 10,519,280 B2 | 12/2019 | Knott et al. |
| 10,526,454 B2 | 1/2020 | Knott et al. |
| 10,544,267 B2 | 1/2020 | Knott et al. |
| 10,544,384 B2 | 1/2020 | Scheuermann et al. |
| 10,787,414 B2 | 9/2020 | Fiedel et al. |
| 10,793,662 B2 | 10/2020 | Günther et al. |
| 10,836,867 B2 | 11/2020 | Knott |
| 10,995,174 B2 | 5/2021 | Emmrich-Smolczyk et al. |
| 11,066,429 B2 | 7/2021 | Knott et al. |
| 2002/0103091 A1 | 8/2002 | Kodali |
| 2006/0167125 A1 | 7/2006 | Bauer et al. |
| 2006/0229375 A1 | 10/2006 | Hsiao et al. |
| 2006/0293400 A1 | 12/2006 | Wiltz, Jr. et al. |
| 2007/0072951 A1 | 3/2007 | Bender et al. |
| 2007/0238800 A1 | 10/2007 | Neal et al. |
| 2007/0270518 A1 | 11/2007 | Nutzel |
| 2009/0088489 A1 | 4/2009 | Terheiden et al. |
| 2011/0021693 A1* | 1/2011 | Henning ............ C08G 77/445 524/588 |
| 2015/0031781 A1 | 1/2015 | Landers et al. |
| 2016/0130402 A1 | 5/2016 | Schubert et al. |
| 2016/0264711 A1 | 9/2016 | Krebs et al. |
| 2016/0264757 A1 | 9/2016 | Krebs et al. |
| 2016/0319094 A1 | 11/2016 | Diendorf et al. |
| 2017/0174817 A1 | 6/2017 | Gunther et al. |
| 2017/0198099 A1 | 7/2017 | Knott |
| 2018/0016392 A1 | 1/2018 | Lobert et al. |
| 2018/0194889 A1 | 7/2018 | Gunther et al. |
| 2018/0208707 A1 | 7/2018 | Krebs et al. |
| 2018/0258228 A1 | 9/2018 | Amajjahe et al. |
| 2019/0100625 A1 | 4/2019 | Knott et al. |
| 2019/0106369 A1 | 4/2019 | Schubert et al. |
| 2019/0106441 A1 | 4/2019 | Knott et al. |
| 2020/0055991 A1 | 2/2020 | Knott et al. |
| 2020/0055992 A1 | 2/2020 | Knott et al. |
| 2020/0377526 A1 | 7/2020 | Knott et al. |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377660 A1 | 12/2020 | Knott et al. |
| 2020/0377665 A1 | 12/2020 | Knott et al. |
| 2020/0377666 A1 | 12/2020 | Knott et al. |
| 2020/0377684 A1 | 12/2020 | Hermann et al. |
| 2020/0377686 A1 | 12/2020 | Knott et al. |
| 2020/0385528 A1 | 12/2020 | Knott |
| 2021/0015269 A1 | 1/2021 | Terheiden et al. |
| 2021/0047474 A1 | 2/2021 | Klostermann et al. |
| 2021/0130551 A1 | 5/2021 | Knott et al. |
| 2021/0137276 A1 | 5/2021 | Landers et al. |
| 2021/0163687 A1 | 6/2021 | Knott et al. |
| 2021/0171719 A1 | 6/2021 | Knott et al. |
| 2021/0214488 A1 | 7/2021 | Emmrich-Smolczyk et al. |
| 2021/0253780 A1 | 8/2021 | Wessely et al. |
| 2021/0253799 A1 | 8/2021 | Knott et al. |
| 2021/0301099 A1 | 9/2021 | Knott et al. |
| 2021/0371598 A1 | 12/2021 | Knott et al. |

FOREIGN PATENT DOCUMENTS

| | | |
|---|---|---|
| DE | 2 533 074 A1 | 3/1976 |
| DE | 4 229 402 A1 | 3/1994 |
| DE | 4 239 054 A1 | 5/1994 |
| DE | 10 2004 001 408 A1 | 7/2005 |
| EP | 0 003 285 A1 | 8/1979 |
| EP | 0 380 993 A2 | 8/1990 |
| EP | 0 493 836 A1 | 7/1992 |
| EP | 0 533 202 A1 | 3/1993 |
| EP | 0 780 414 A2 | 6/1997 |
| EP | 0 839 852 A2 | 5/1998 |
| EP | 0 867 465 A1 | 9/1998 |
| EP | 1 161 474 A1 | 12/2001 |
| EP | 1 520 870 A1 | 4/2005 |
| EP | 1 537 159 A1 | 6/2005 |
| EP | 1 544 235 A1 | 6/2005 |
| EP | 1 678 232 A2 | 7/2006 |
| EP | 1 712 578 A1 | 10/2006 |
| EP | 2 042 534 A1 | 4/2009 |
| EP | 2 104 696 B1 | 9/2013 |
| EP | 3 219 738 A1 | 9/2017 |
| EP | 3 467 006 A1 | 4/2019 |
| EP | 3 492 513 A1 | 6/2019 |
| EP | 3 611 215 A1 | 2/2020 |
| EP | 3 663 346 A1 | 6/2020 |
| WO | 96/12759 A2 | 5/1996 |
| WO | 00/58383 A1 | 10/2000 |
| WO | 01/58976 A1 | 8/2001 |
| WO | 02/22702 A1 | 3/2002 |
| WO | 03/029320 A1 | 4/2003 |
| WO | 2004/020497 A1 | 3/2004 |
| WO | 2004/060956 A1 | 7/2004 |
| WO | 2004/096882 A1 | 11/2004 |
| WO | 2005/033167 A1 | 4/2005 |
| WO | 2005/063841 A1 | 7/2005 |
| WO | 2005/085310 A2 | 9/2005 |
| WO | 2005/118668 A1 | 12/2005 |
| WO | 2006/055396 A1 | 5/2006 |
| WO | 2006/094227 A2 | 9/2006 |
| WO | 2006/116456 A1 | 11/2006 |
| WO | 2007/111828 A2 | 10/2007 |
| WO | 2008/058913 A1 | 5/2008 |
| WO | 2009/058367 A1 | 5/2009 |
| WO | 2009/130470 A1 | 10/2009 |
| WO | 2010/028362 A1 | 3/2010 |
| WO | 2011/163133 A1 | 12/2011 |
| WO | 2013/022932 A1 | 2/2013 |
| WO | 2013/102053 A1 | 7/2013 |
| WO | 2019219446 A1 | 11/2019 |
| WO | 2019219452 A1 | 11/2019 |

OTHER PUBLICATIONS

Knott et al., U.S. Appl. No. 17/297,372, filed May 26, 2021.
Knott et al., U.S. Appl. No. 17/476,417, filed Sep. 15, 2021.
Modro et al., U.S. Appl. No. 17/367,456, filed Jul. 5, 2021.
Glos et al., U.S. Appl. No. 17/414,678, filed Jun. 16, 2021.
Glos et al., U.S. Appl. No. 17/414,726, filed Jun. 16, 2021.
Wagner et al., U.S. Appl. No. 17/391,664, filed Aug. 2, 2021.
Ferenz et al., U.S. Appl. No. 17/523,059, filed Nov. 10, 2021.
European Search Report dated Oct. 31, 2019 in EP 19176877.9 (5 pages).
Herrmann et al., U.S. Appl. No. 17/448,240, filed Sep. 21, 2021.

* cited by examiner

PRODUCTION OF PU FOAMS

CROSS REFERENCE TO RELATED APPLICATIONS

This application is a 35 U.S.C. § 119 patent application which claims the benefit of European Application No. 19176877.9 filed May 28, 2019, which is incorporated herein by reference in its entirety.

FIELD

The present invention is in the field of PU foams. It relates more particularly to a process for producing PU foams using SiOC-bonded polyether siloxanes having branching in the siloxane moiety, prepared from branched siloxanes bearing acetoxy groups.

BACKGROUND

Polyurethane foams (PU foams) are known per se. These are cellular and/or microcellular polyurethane materials. They can be divided into classes including closed-cell or partly closed-cell rigid PU foams and open-cell or partly open-cell flexible PU foams. Rigid PU foams are used predominantly as insulation materials, for example in refrigerator systems or in the thermal insulation of buildings. Flexible PU foams are used in a multitude of technical applications in industry and the domestic sector, for example for sound deadening, for production of mattresses or for cushioning of furniture. An example of a particularly important market for various types of PU foams, such as conventional flexible foams based on ether or ester polyols, cold-cure flexible foams, also referred to as cold-cure foams hereinafter (frequently also as "high-resilience" (HR) foams), and rigid foams, and also foams having properties between these two classifications, is the automobile industry. It is possible here, for example, to use rigid foams as inner roof liner, ester foams as interior door trim and for die-cut sun visors, and cold-cure and flexible foams for seat systems. A further particularly important market relates to mattresses and seating systems in homes, offices and the like. With regard to flexible foams, a distinction can also be made between cold-cure flexible foams and hot-cure flexible foams, as described, for example, in EP 2042 534 A1, to which reference is made here in full.

SUMMARY

There is still a need to improve the production of PU foams with regard to product quality, especially with regard to the production of low-odor PU foams and/or with regard to the production of ageing-resistant PU foams. A specific problem addressed by the present invention was therefore that of providing PU foams that preferably have low odor and/or have improved ageing resistance.

It has been found that, surprisingly, this problem is solved by a process for producing PU foams using SiOC-bonded polyether siloxanes having branching in the siloxane moiety, prepared from branched siloxanes bearing acetoxy groups.

DETAILED DESCRIPTION

Against this background, the present invention provides a process for producing PU foams by reacting
(a) at least one polyol component with
(b) at least one isocyanate component
in the presence of
(c) one or more catalysts that catalyse the isocyanate-polyol and/or isocyanate-water reactions and/or isocyanate trimerization, and
(d) optionally one or more chemical or physical blowing agents,
with use of
(e) SiOC-bonded polyether siloxanes having branching in the siloxane moiety, prepared from
(f) branched siloxanes bearing acetoxy groups,
wherein a sufficient amount of the SiOC-bonded polyether siloxane (e) having branching in the siloxane moiety is added that the proportion by mass of this polyether siloxane (e) based on the finished PU foam is from 0.0001% to 10% by weight, preferably 0.01% to 6% by weight, especially 0.1% to 5% by weight.

Components (a) to (d) are known per se; they are described more specifically further down. Component (e) and the provision thereof from branched siloxanes (f) bearing acetoxy groups are described in more detail further down.

Advantageously, the present invention enables the provision of low-odor PU foams, especially of low-odor flexible PU foams, as demonstrated in the examples. What is meant here by "low-odor" is that the resulting PU foam has a lower product odor as a result of the use of the SiOC-bonded polyether siloxanes having branching in the siloxane moiety, prepared from branched siloxanes bearing acetoxy groups, that are used in accordance with the invention by comparison with foams produced in an otherwise comparable manner, except that stabilizers according to the prior art have been used, which is verifiable especially by olfactory testing by a panel of personnel trained in odor assessment.

Advantageously, the present invention additionally enables the provision of ageing-resistant PU foams, especially of more ageing-resistant flexible PU foams, as demonstrated in the examples. What is meant here by "more ageing-resistant" is that the resulting PU foam is more ageing-resistant as a result of the use of the SiOC-bonded polyether siloxanes having branching in the siloxane moiety, prepared from branched siloxanes bearing acetoxy groups, that are used in accordance with the invention by comparison with foams produced in an otherwise comparable manner, except that stabilizers according to the prior art have been used. Ageing properties are verified in the context of this invention via the measurement of compression set, as set out in detail in the Experimental.

Advantageously, the present invention additionally enables the provision of PU foams having reduced aldehyde emissions, such as preferably formaldehyde, acetaldehyde and propionaldehyde, especially propionaldehyde.

The subject-matter of the invention will be described by way of example below, without any intention that the invention be restricted to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing individual values (ranges) or compounds. Where documents are cited in the context of the present description, the entire content thereof, particularly with regard to the subject matter that forms the context in which the document has been cited, is intended to form part of the disclosure content of the present invention. Unless stated otherwise, percentages are figures in percent by weight. When average values are reported below, the values in question are weight averages, unless stated otherwise. Where parameters which have been determined by measurement are reported below, the measurements have been carried out at a temperature of 25° C. and a pressure of 101 325 Pa, unless stated otherwise.

Polyurethane (PU) in the context of the present invention is especially understood to mean a product obtainable by reaction of polyisocyanates and polyols, or compounds having isocyanate-reactive groups. Further functional groups in addition to the polyurethane can also be formed in the reaction, examples being uretdiones, carbodiimides, isocyanurates, allophanates, biurets, ureas and/or uretonimines. Therefore, PU is understood in the context of the present invention to mean both polyurethane and polyisocyanurate, polyureas, and polyisocyanate reaction products containing uretdione, carbodiimide, allophanate, biuret and uretonimine groups. In the context of the present invention, polyurethane foam (PU foam) is understood to mean foam which is obtained as reaction product based on polyisocyanates and polyols or compounds having isocyanate-reactive groups. The reaction to give what is named a polyurethane can form further functional groups as well, examples being allophanates, biurets, ureas, carbodiimides, uretdiones, isocyanurates or uretonimines. Therefore, PU foams are understood in the context of the present invention to mean both PU foams (PUR foams) and polyisocyanurate foams (PIR foams). Preferred PU foams are flexible PU foams, rigid PU foams and integral PU foams. Particular preference is given in this context to conventional flexible PU foams based on ether or ester polyols, highly resilient cold-cure polyurethane foams (also referred to hereinafter as "high-resilience", i.e. HR PU foams), viscoelastic PU foams, hypersoft PU foams, semirigid PU foams and rigid PU foams, and also PU foams which have properties between these classifications and are used in the automobile industry. More particularly, all the aforementioned PU foam types are covered by the invention.

It will be apparent that a person skilled in the art seeking to produce the different PU foam types, for example hot-cure, cold-cure or ester-type flexible PU foams or rigid PU foams, will appropriately select the substances necessary for the purpose in each case, for example isocyanates, polyols, stabilizers, surfactants, etc., in order to obtain the desired polyurethane type, especially PU foam type.

In the inventive production of PU foams, preference is given to reacting at least one polyol component and at least one isocyanate component with one another, optionally in the presence of water, physical or chemical blowing agents, flame retardants, catalysts and/or further additives, with use of SiOC-bonded polyether siloxanes branched in the siloxane moiety, prepared from branched siloxanes bearing acetoxy groups.

Further details of the usable starting materials, catalysts and auxiliaries and additives can also be found, for example, in Kunststoffhandbuch [Plastics Handbook], volume 7, Polyurethane [Polyurethanes], Carl-Hanser-Verlag Munich, 1st edition 1966, 2nd edition 1983 and 3rd edition 1993. The compounds, components and additives below are usable with preference.

The isocyanate components used are preferably one or more organic polyisocyanates having two or more isocyanate functions. Polyol components used are preferably one or more polyols having two or more isocyanate-reactive groups.

Isocyanates suitable as isocyanate components for the purposes of this invention are all isocyanates containing at least two isocyanate groups. Generally, it is possible to use all aliphatic, cycloaliphatic, arylaliphatic and preferably aromatic polyfunctional isocyanates known per se. Preferably, isocyanates are used within a range from 60 to 350 mol %, more preferably within a range from 60 to 140 mol %, relative to the sum total of the isocyanate-consuming components.

Specific examples are alkylene diisocyanates having 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomer mixtures, and preferably aromatic diisocyanates and polyisocyanates, for example tolylene 2,4- and 2,6-diisocyanate (TDI) and the corresponding isomer mixtures, mixtures of diphenylmethane 2,4'- and 2,2'-diisocyanates (MDI) and polyphenylpolymethylene polyisocyanates (crude MDI) and mixtures of crude MDI and tolylene diisocyanates (TDI). The organic diisocyanates and polyisocyanates can be used individually or in the form of mixtures thereof.

It is also possible to use isocyanates which have been modified by the incorporation of urethane, uretdione, isocyanurate, allophanate and other groups, called modified isocyanates.

Particularly suitable organic polyisocyanates which are therefore used with particular preference are various isomers of tolylene diisocyanate (tolylene 2,4- and 2,6-diisocyanate (TDI), in pure form or as isomer mixtures of various composition), diphenylmethane 4,4'-diisocyanate (MDI), "crude MDI" or "polymeric MDI" (contains the 4,4' isomer and also the 2,4' and 2,2' isomers of MDI and products having more than two rings) and also the two-ring product which is referred to as "pure MDI" and is composed predominantly of 2,4' and 4,4' isomer mixtures, and prepolymers derived therefrom. Examples of particularly suitable isocyanates are detailed, for example, in EP 1712578, EP 1161474, WO 00/58383, US 2007/0072951, EP 1678232 and WO 2005/085310, which are hereby fully incorporated by reference.

Polyols suitable as polyol component for the purposes of the present invention are all organic substances having two or more isocyanate-reactive groups, preferably OH groups, and also formulations thereof. Preferred polyols include any polyether polyols and/or polyester polyols and/or hydroxyl-containing aliphatic polycarbonates, especially polyether polycarbonate polyols and/or natural oil-based polyols (NOPs) that are typically used for production of polyurethane systems, especially PU foams. The polyols usually have a functionality of from 1.8 to 8 and number-average molecular weights in the range from 500 to 15 000. The polyols are typically used with OH numbers in the range from 10 to 1200 mg KOH/g. The number-average molecular weights are typically determined by gel permeation chromatography (GPC), especially using polypropylene glycol as reference substance and tetrahydrofuran (THF) as eluent. The OH numbers can be determined, in particular, in accordance with the DIN standard DIN 53240:1971-12.

Polyether polyols usable with preference are obtainable by known methods, for example by anionic polymerization of alkylene oxides in the presence of alkali metal hydroxides, alkali metal alkoxides or amines as catalysts and by addition of at least one starter molecule, which preferably contains 2 or 3 reactive hydrogen atoms in bonded form, or by cationic polymerization of alkylene oxides in the presence of Lewis acids such as, for example, antimony pentachloride or boron trifluoride etherate, or by double metal cyanide catalysis. Suitable alkylene oxides contain from 2 to 4 carbon atoms in the alkylene radical. Examples are tetrahydrofuran, 1,3-propylene oxide, 1,2-butylene oxide and 2,3-butylene oxide; ethylene oxide and 1,2-propylene oxide are preferably used. The alkylene oxides can be used individually, cumulatively, in blocks, in alternation or as mixtures. Starter molecules used may especially be compounds having at least 2, preferably 2 to 8, hydroxyl groups, or having at least two primary amino groups in the molecule. Starter molecules used may, for example, be water, di-, tri- or tetrahydric alcohols such as ethylene glycol, propane-1,2- and -1,3-diol, diethylene glycol, dipropylene glycol, glycerol, trimethylolpropane, pentaerythritol, castor oil, etc., higher polyfunctional polyols, especially sugar compounds, for example glucose, sorbitol, mannitol and sucrose, polyhydric phenols, resols, for example oligomeric condensation products of phenol and formaldehyde and Mannich condensates of phenols, formaldehyde and dialkanolamines, and also melamine, or amines such as aniline, EDA, TDA, MDA and PMDA, more preferably TDA and PMDA. The choice of the suitable starter molecule depends on the particular field of use of the resulting polyether polyol in the polyurethane production (for example, polyols used for production of flexible PU foams are different from those used in the production of rigid PU foams).

Polyester polyols usable with preference are based on esters of polybasic aliphatic or aromatic carboxylic acids, preferably having 2 to 12 carbon atoms. Examples of aliphatic carboxylic acids are succinic acid, glutaric acid, adipic acid, suberic acid, azelaic acid, sebacic acid, decanedicarboxylic acid, maleic acid and fumaric acid. Examples of aromatic carboxylic acids are phthalic acid, isophthalic acid, terephthalic acid and the isomeric naphthalenedicarboxylic acids. The polyester polyols are obtained by condensation of these polybasic carboxylic acids with polyhydric alcohols, preferably of diols or triols having 2 to 12, more preferably having 2 to 6, carbon atoms, preferably trimethylolpropane and glycerol.

Polyether polycarbonate polyols usable with preference are polyols containing carbon dioxide bound in the form of carbonate. Since carbon dioxide forms as a by-product in large volumes in many processes in the chemical industry, the use of carbon dioxide as comonomer in alkylene oxide polymerizations is of particular interest from a commercial point of view. Partial replacement of alkylene oxides in polyols with carbon dioxide has the potential to distinctly lower the costs for the production of polyols. Moreover, the use of $CO_2$ as comonomer is very advantageous in environmental terms, since this reaction constitutes the conversion of a greenhouse gas to a polymer. The preparation of polyether polycarbonate polyols by addition of alkylene oxides and carbon dioxide onto H-functional starter substances by use of catalysts is well known. Various catalyst systems can be used here: The first generation was that of heterogeneous zinc or aluminium salts, as described, for example, in U.S. Pat. No. 3,900,424 or 3,953,383. In addition, mono- and binuclear metal complexes have been used successfully for copolymerization of $CO_2$ and alkylene oxides (WO 2010/028362, WO 2009/130470, WO 2013/022932 or WO 2011/163133). The most important class of catalyst systems for the copolymerization of carbon dioxide and alkylene oxides is that of double metal cyanide catalysts, also referred to as DMC catalysts (U.S. Pat. No. 4,500,704, WO 2008/058913). Suitable alkylene oxides and H-functional starter substances are those also used for preparing carbonate-free polyether polyols, as described above.

Polyols usable with preference that are based on renewable raw materials, natural oil-based polyols (NOPs), for production of PU foams are of increasing interest with regard to the long-term limits in the availability of fossil resources, namely oil, coal and gas, and against the background of rising crude oil prices, and have already been described many times in such applications (WO 2005/033167; US 2006/0293400, WO 2006/094227, WO 2004/096882, US 2002/0103091, WO 2006/116456 and EP 1678232). A number of these polyols are now available on the market from various manufacturers (WO2004/020497, US2006/0229375, WO2009/058367). Depending on the base raw material (e.g. soya bean oil, palm oil or castor oil) and the subsequent workup, polyols having a different profile of properties are the result. It is possible here to distinguish essentially between two groups: a) polyols based on renewable raw materials which are modified such that they can be used to an extent of 100% for production of polyurethanes (WO2004/020497, US2006/0229375); b) polyols based on renewable raw materials which, because of the processing and properties thereof, can replace the petrochemical-based polyol only in a certain proportion (WO2009/058367).

A further class of polyols usable with preference is that of the so-called filled polyols (polymer polyols). A feature of these is that they contain dispersed solid organic fillers up to a solids content of 40% or more. SAN, PUD and PIPA polyols are among useful polyols. SAN polyols are highly reactive polyols containing a dispersed copolymer based on styrene-acrylonitrile (SAN). PUD polyols are highly reactive polyols containing polyurea, likewise in dispersed form. PIPA polyols are highly reactive polyols containing a dispersed polyurethane, for example formed by in situ reaction of an isocyanate with an alkanolamine in a conventional polyol.

The solids content, which is preferably between 5% and 40%, based on the polyol, depending on the application, is responsible for improved cell opening, and so the polyol can be foamed in a controlled fashion, especially with TDI, and no shrinkage of the foams occurs. The solids content thus acts as an essential processing aid. A further function is to control the hardness via the solids content, since higher solids contents bring about a greater hardness on the part of the foam. The formulations with solids-containing polyols are distinctly less self-stable and therefore tend to require physical stabilization in addition to the chemical stabilization due to the crosslinking reaction. Depending on the solids contents of the polyols, these can be used for example alone or for example in a blend with the abovementioned unfilled polyols.

A further class of polyols usable with preference is of those that are obtained as prepolymers via reaction of polyol with isocyanate in a molar ratio of 100:1 to 5:1, preferably 50:1 to 10:1. Such prepolymers are preferably made up in the form of a solution in polymer, and the polyol preferably corresponds to the polyol used for preparing the prepolymers.

A further class of polyols usable with preference is that of the so-called autocatalytic polyols, especially autocatalytic polyether polyols. Polyols of this kind are based, for example, on polyether blocks, preferably on ethylene oxide and/or propylene oxide blocks, and additionally include catalytically active functional groups, for example nitrogen-containing functional groups, especially amino groups, preferably tertiary amine functions, urea groups and/or heterocycles containing nitrogen atoms. Through the use of such autocatalytic polyols in the production of PU foams, preferably flexible PU foams, it is possible, as the case may be, to reduce the required amount of any catalysts used in addition, depending on application, and/or to match it to specific desired foam properties. Suitable polyols are described, for example, in WO0158976 (A1), WO2005063841 (A1), WO0222702 (A1), WO2006055396 (A1), WO03029320 (A1), WO0158976 (A1), U.S. Pat. No. 6,924,321 (B2), U.S. Pat. No. 6,762,274 (B2), EP2104696 (B1), WO2004060956 (A1) or WO2013102053 (A1) and can be purchased, for example, under the Voractiv™ and/or SpecFlex™ Activ trade names from Dow.

Depending on the required properties of the resulting foams, it is advantageously possible to use appropriate polyols, as described for example in: US 2007/0072951 A1, WO 2007/111828, US 2007/0238800, U.S. Pat. No. 6,359,022 or WO 96/12759. Further polyols are known to those skilled in the art and can be found, for example, in EP-A-0380993 or U.S. Pat. No. 3,346,557, to which reference is made in full.

One preferred embodiment of the invention, in particular for production of moulded and highly resilient flexible PU foams, utilizes di- and/or trifunctional polyether alcohols comprising primary hydroxyl groups in amounts of preferably above 50%, more preferably above 80%, in particular those having an ethylene oxide block at the chain end. According to the required properties of this embodiment which is preferred in accordance with the invention, especially for production of the abovementioned foams, preference is given to using not only the polyether alcohols described here but also further polyether alcohols which bear primary hydroxyl groups and are based predominantly on ethylene oxide, in particular having a proportion of ethylene oxide blocks of >70%, preferably >90%. All polyether alcohols described in the context of this preferred embodiment preferably have a functionality of from 2 to 8, more preferably from 2 to 5, number-average molecular weights in the range from 2500 to 15 000, preferably from 4500 to 12 000, and usually OH numbers in the range from 5 to 80, preferably from 20 to 50 mg KOH/g.

In a further preferred embodiment of the invention, especially for production of flexible slabstock PU foam, di- and/or trifunctional polyether alcohols having secondary hydroxyl groups in amounts of preferably above 50%, more preferably above 90%, are used, especially those having a propylene oxide block or random propylene oxide and ethylene oxide block at the chain end, or those based solely on propylene oxide blocks. Such polyether alcohols preferably have a functionality of from 2 to 8, more preferably from 2 to 4, number-average molecular weights in the range from 500 to 8000, preferably from 800 to 5000, more preferably from 2500 to 4500, and usually OH numbers in the range from 10 to 100, preferably from 20 to 60, mg KOH/g.

In a further preferred embodiment of the invention, especially for production of PU foams, preferably of flexible PU foams, preferably for production of moulded and highly resilient flexible foams, autocatalytic polyols as described above are used.

In a further preferred embodiment of the invention, especially for production of flexible PU-polyester foams, polyester alcohols based on diols and/or triols, preferably glycerol and/or trimethylolpropane, and aliphatic carboxylic acids, preferably adipic acid, suberic acid, azelaic acid and/or sebacic acid, are used. Such polyester alcohols preferably have a functionality of 2 to 4, more preferably 2 to 3, number-average molecular weights in the range from 200-4000, preferably 400-3000 and more preferably 600-2500, and typically OH numbers in the range of 10-1000, preferably 20-500 and more preferably 30-300 mg KOH/g.

In a further preferred embodiment of the invention, especially for production of rigid polyisocyanurate (PIR) foams, polyester alcohols based on diols and/or triols, preferably monoethylene glycol, and aromatic carboxylic acids, preferably phthalic acid and/or terephthalic acid, are used. Such polyester alcohols preferably have a functionality of 2 to 4, more preferably 2 to 3, number-average molecular weights in the range from 200-1500, preferably 300-1200 and more preferably 400-1000, and typically OH numbers in the range of 100-500, preferably 150-300 and more preferably 180-250 mg KOH/g.

In a further preferred embodiment of the invention, especially for production of rigid PU foams, di- to octafunctional polyether alcohols having secondary hydroxyl groups in amounts of preferably above 50%, more preferably above 90%, are used, especially those having a propylene oxide block or random propylene oxide and ethylene oxide block at the chain end, or those based solely on propylene oxide blocks. Such polyether alcohols preferably have a functionality of 2 to 8, more preferably 3 to 8, number-average molecular weights in the range from 500 to 2000, preferably 800 to 1200, and typically OH numbers in the range from 100 to 1200, preferably 120 to 700 and more preferably 200 to 600 mg KOH/g. Depending on the properties required of these foams that are preferred in accordance with the invention, the use of the polyols described herein may be accompanied by the additional use of polyether alcohols as described above with comparatively high number-average molecular weights and comparatively low OH numbers, and/or additional polyester polyols, based on aromatic carboxylic acids as described above.

In a further preferred embodiment of the invention, especially for production of viscoelastic PU foams, preference is given to using mixtures of various, preferably two or three, polyfunctional polyester alcohols and/or polyether alcohols. Typically, the polyol combinations used herein consist of a low molecular weight crosslinker polyol, for example a rigid foam polyol, of high functionality (>3) and/or a conventional high molecular weight slabstock flexible foam or HR polyol, and/or a hypersoft polyether polyol having a high fraction of ethylene oxide blocks and having cell-opening properties.

A preferred ratio of isocyanate and polyol, expressed as the index of the formulation, i.e. as stoichiometric ratio of isocyanate groups to isocyanate-reactive groups (e.g. OH groups, NH groups) multiplied by 100, is in the range from 10 to 1000, preferably 40 to 350, more preferably 70 to 140. An index of 100 represents a molar reactive group ratio of 1:1.

Catalysts used in the context of this invention may, for example, be any catalysts for the isocyanate-polyol (urethane formation) and/or isocyanate-water (amine and carbon dioxide formation) and/or isocyanate dimerization (uretdione formation), isocyanate trimerization (isocyanurate formation), isocyanate-isocyanate with $CO_2$ elimination (carbodiimide formation) and/or isocyanate-amine (urea formation) reactions and/or "secondary" crosslinking reactions such as isocyanate-urethane (allophanate formation) and/or isocyanate-urea (biuret formation) and/or isocyanate-carbodiimide (uretonimine formation).

Suitable catalysts for the purposes of the present invention are, for example, substances which catalyse one of the aforementioned reactions, especially the gelling reaction (isocyanate-polyol), the blowing reaction (isocyanate-water) and/or the dimerization or trimerization of the isocyanate. Such catalysts are preferably nitrogen compounds, especially amines and ammonium salts, and/or metal compounds.

Suitable nitrogen compounds as catalysts, also referred to hereinafter as nitrogen-containing catalysts, for the purposes of the present invention are all nitrogen compounds according to the prior art which catalyse one of the abovementioned isocyanate reactions and/or can be used for production of polyurethanes, especially of polyurethane foams.

Examples of suitable nitrogen-containing compounds as catalysts for the purposes of the present invention are preferably amines, especially tertiary amines or compounds containing one or more tertiary amine groups, including the amines triethylamine, N,N-dimethylcyclohexylamine, N,N-dicyclohexylmethylamine, N,N-dimethylaminoethylamine, N,N,N',N'-tetramethylethylene-1,2-diamine, N,N,N',N'-tetramethylpropylene-1,3-diamine, N,N,N',N'-tetramethyl-1,4-butanediamine, N,N,N',N'-tetramethyl-1,6-hexanediamine, N,N,N',N",N"-pentamethyldiethylenetriamine, N,N,N'-trimethylaminoethylethanolamine, N,N-dimethylaminopropylamine, N,N-diethylaminopropylamine, N,N-dimethylaminopropyl-N',N'-dipropan-2-olamine, 2-[[3-(dimethylamino)propyl]methylamino]ethanol, 3-(2-dimethylamino)ethoxypropylamine, N,N-bis[3-(dimethylamino)propyl]amine, N,N,N',N",N"-pentamethyldipropylenetriamine, 1-[bis[3-(dimethylamino)propyl]amino]-2-propanol, N,N-bis[3-(dimethylamino)propyl]-N',N'-dimethylpropane-1,3-diamine, triethylenediamine, 1,4-diazabicyclo[2.2.2]octane-2-methanol, N,N'-dimethylpiperazine, 1,2-dimethylimidazole, N-(2-hydroxypropyl)imidazole, 1-isobutyl-2-methylimidazole, N-(3-aminopropyl)imidazole, N-methylimidazole, N-ethylmorpholine, N-methylmorpholine, 2,2,4-trimethyl-2-silamorpholine, N-ethyl-2,2-dimethyl-2-silamorpholine, N-(2-aminoethyl)morpholine, N-(2-hydroxyethyl)morpholine, bis(2-morpholinoethyl) ether, N,N'-dimethylpiperazine, N-(2-hydroxyethyl)piperazine, N-(2-aminoethyl)piperazine, N,N-dimethylbenzylamine, N,N-dimethylaminoethanol, N,N-diethylaminoethanol, 3-dimethylamino-1-propanol, N,N-dimethylaminoethoxyethanol, N,N-diethylaminoethoxyethanol, bis(2-dimethylaminoethyl) ether, N,N,N'-trimethyl-N'-(2-hydroxyethyl)bis(2-aminoethyl) ether, N,N,N'-trimethyl-N-3'-aminopropyl bisaminoethyl ether, tris(dimethylaminopropyl)hexahydro-1,3,5-triazine, 1,8-diazabicyclo[5.4.0]undec-7-ene, 1,5-diazabicyclo[4.3.0]non-5-ene, 1,5,7-triazabicyclo[4.4.0]dec-5-ene, N-methyl-1,5,7-triazabicyclo[4.4.0]dec-5-ene, 1,4,6-triazabicyclo[3.3.0]oct-4-ene, 1,1,3,3-tetramethylguanidine, tert-butyl-1,1,3,3-tetramethylguanidine, guanidine, 3-dimethylaminopropylurea, 1,3-bis[3-(dimethylamino)propyl] urea, bis-N,N-(dimethylaminoethoxyethyl)isophorone dicarbamate, 3-dimethylamino-N,N-dimethylpropionamide and 2,4,6-tris(dimethylaminomethyl)phenol. Suitable nitrogen-containing catalysts according to the prior art can be purchased, for example, from Evonik under the TEGOAMIN® trade name.

According to the application, it may be preferable that, in the inventive production of polyurethane foams, quaternized and/or protonated nitrogen-containing catalysts, especially quaternized and/or protonated tertiary amines, are used.

For possible quaternization of nitrogen-containing catalysts, it is possible to use any reagents known as quaternizing reagents. Preference is given to using alkylating agents such as dimethyl sulfate, methyl chloride or benzyl chloride, preferably methylating agents such as, in particular, dimethyl sulfate, as quaternizing agents. Quaternization can likewise be carried out using alkylene oxides, such as ethylene oxide, propylene oxide or butylene oxide, preferably with subsequent neutralization using inorganic or organic acids.

Nitrogen-containing catalysts, if quaternized, may be singly or multiply quaternized. Preferably, the nitrogen-containing catalysts are only singly quaternized. In the case of single quaternization, the nitrogen-containing catalysts are preferably quaternized on a tertiary nitrogen atom.

Nitrogen-containing catalysts can be converted to the corresponding protonated compounds by reaction with organic or inorganic acids. These protonated compounds may be preferable, for example, when, for example, a slowed polyurethane reaction is to be achieved or when the reaction mixture is to have enhanced flow behavior in use.

Organic acids used may, for example, be any organic acids mentioned below, for example carboxylic acids having from 1 to 36 carbon atoms (aromatic or aliphatic, linear or branched), for example formic acid, lactic acid, 2-ethylhexanoic acid, salicylic acid and neodecanoic acid, or else polymeric acids such as polyacrylic or polymethacrylic acids. Inorganic acids used may, for example, be phosphorus-based acids, sulfur-based acids or boron-based acids.

However, the use of nitrogen-containing catalysts which have not been quaternized or protonated is particularly preferred in the context of this invention.

Suitable metal compounds as catalysts, also referred to hereinafter as metallic catalysts, for the purposes of the present invention are all metal compounds according to the prior art which catalyse one of the abovementioned isocyanate reactions and/or can be used for production of polyurethanes, especially of polyurethane foams. They may be selected, for example, from the group of the metal-organic or organometallic compounds, metal-organic or organometallic salts, organic metal salts, inorganic metal salts, and from the group of the charged or uncharged metallic coordination compounds, especially the metal chelate complexes.

The expression "metal-organic or organometallic compounds" in the context of this invention especially encompasses the use of metal compounds having a direct carbon-metal bond, also referred to here as metal organyls (e.g. tin organyls) or organometallic compounds (e.g. organotin compounds). The expression "organometallic or metal-organic salts" in the context of this invention especially encompasses the use of metal-organic or organometallic compounds having salt character, i.e. ionic compounds in which either the anion or cation is organometallic in nature (e.g. organotin oxides, organotin chlorides or organotin carboxylates). The expression "organic metal salts" in the context of this invention especially encompasses the use of metal compounds which do not have any direct carbon-metal bond and are simultaneously metal salts, in which either the anion or the cation is an organic compound (e.g. tin(II) carboxylates). The expression "inorganic metal salts" in the context of this invention especially encompasses the use of metal compounds or of metal salts in which neither the anion nor the cation is an organic compound, e.g. metal chlorides (e.g. tin(II) chloride), pure metal oxides (e.g. tin oxides) or mixed metal oxides, i.e. containing a plurality of metals, and/or metal silicates or aluminosilicates. The expression "coordination compound" in the context of this invention especially encompasses the use of metal compounds formed from one or more central particles and one or more ligands, the central particles being charged or uncharged metals (e.g. metal- or tin-amine complexes). For the purposes of the present invention, the expression "metal-chelate complexes" encompasses especially the use of metal-containing coordination compounds which have ligands having at least two coordination or bonding positions to the metal centre (e.g. metal- or tin-polyamine or metal- or tin-polyether complexes).

Suitable metal compounds, especially as defined above, as possible catalysts in the context of the present invention may be selected, for example, from all metal compounds containing lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead, and/or bismuth, especially sodium, potassium, magnesium, calcium, titanium, zirconium, molybdenum, tungsten, zinc, aluminium, tin and/or bismuth, more preferably tin, bismuth, zinc and/or potassium.

Suitable organometallic salts and organic metal salts, especially as defined above, as catalysts in the context of the present invention are, for example, organotin, tin, zinc, bismuth and potassium salts, in particular corresponding metal carboxylates, alkoxides, thiolates and mercaptoacetates, for example dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis(n-lauryl mercaptide), dimethyltin bis(n-lauryl mercaptide), monomethyltin tris(2-ethylhexyl mercaptoacetate), dimethyltin bis(2-ethylhexyl mercaptoacetate), dibutyltin bis(2-ethylhexyl mercaptoacetate), dioctyltin bis(isooctyl mercaptoacetate), tin(II) acetate, tin(II) 2-ethylhexanoate (tin(II) octoate), tin(II) isononanoate (tin(II) 3,5,5-trimethylhexanoate), tin(II) neodecanoate, tin(II) ricinoleate, tin(II) oleate, zinc(II) acetate, zinc(II) 2-ethylhexanoate (zinc(II) octoate), zinc(II) isononanoate (zinc(II) 3,5,5-trimethylhexanoate), zinc(II) neodecanoate, zinc(II) ricinoleate, bismuth acetate, bismuth 2-ethylhexanoate, bismuth octoate, bismuth isononanoate, bismuth neodecanoate, potassium formate, potassium acetate, potassium 2-ethylhexanoate (potassium octoate), potassium isononanoate, potassium neodecanoate and/or potassium ricinoleate.

In the inventive production of polyurethane foams, it may be preferable to rule out the use of organometallic salts, for example of dibutyltin dilaurate.

Suitable possible metallic catalysts are generally and preferably selected such that they do not have any troublesome intrinsic odor and are essentially toxicologically safe, and such that the resulting polyurethane systems, especially polyurethane foams, have a minimum level of catalyst-related emissions.

In the inventive production of polyurethane foams, it may be preferable, according to the type of application, to use incorporable/reactive or high molecular weight catalysts. Catalysts of this kind may be selected, for example, from the group of the metal compounds, preferably from the group of the tin, zinc, bismuth and/or potassium compounds, especially from the group of the metal carboxylates of the aforementioned metals, for example the tin, zinc, bismuth and/or potassium salts of isononanoic acid, neodecanoic acid, ricinoleic acid and/or oleic acid, and/or from the group of the nitrogen compounds, especially from the group of the low-emission amines and/or the low-emission compounds containing one or more tertiary amine groups, for example described by the amines dimethylaminoethanol, N,N-dimethyl-N',N'-di(2-hydroxypropyl)-1,3-diaminopropane, N,N-dimethylaminopropylamine, N,N,N'-trimethyl-N'-hydroxyethylbis(aminoethyl) ether, N-[2-[2-(dimethylamino)ethoxy]ethyl]-N-methylpropane-1,3-diamine, N,N-bis[3-(dimethylamino)propyl]propane-1,3-diamine, 1,1'-[(3-{bis[3-(dimethylamino)propyl]-amino}propyl)imino]dipropan-2-ol, bis(N,N-dimethylaminopropyl)amine, 6-dimethylaminoethyl-1-hexanol, N-(2-hydroxypropyl)imidazole, N-(3-aminopropyl)imidazole, aminopropyl-2-methylimidazole, N,N,N'-trimethylaminoethanolamine, 2-(2-(N,N-dimethylaminoethoxy)ethanol, N-(dimethyl-3-aminopropyl)urea derivatives and alkylaminooxamides, such as bis(N—(N',N'-dimethylaminopropyl))oxamide, bis(N—(N',N'-dimethylaminoethyl))oxamide, bis(N—(N',N'-imidazolidinylpropyl)oxamide, bis(N—(N',N'-diethylaminoethyl))oxamide, bis(N—(N',N'-diethylaminopropyl)oxamide, bis(N—(N',N'-diethylaminoethyl)oxamide, bis(N—(N',N'-diethylimino-1-methylpropyl)oxamide, bis(N-(3-morpholinopropylyl)oxamide, and the reaction products thereof with alkylene oxides, preferably having a molar mass in the range between 160 and 500 g/mol, and compounds of the general formula:

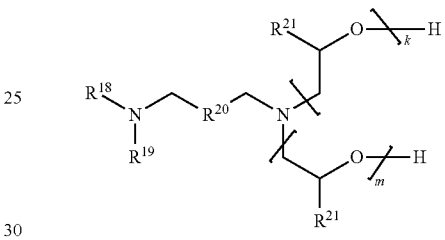

with
$R^{18}$, $R^{19}$=—$C_aH_{2a+i}$ with a=1-4 for acyclic groups
$R^{18}$, $R^{19}$=—$C_bH_cN_d$— with b=3-7, c=6-14, d=0-2 for cyclic groups
$R^{20}$=$C_eH_fO_g$ with e=0-4, f=0-8, g=0-2
$R^{21}$=—H, —$CH_3$, —$C_2H_5$
k, m=identically or differently 1-5.

Such catalysts and/or mixtures are supplied commercially, for example, under the following names: Jeffcat® ZF-10, Lupragen® DMEA, Lupragen® API, Toyocat® RX 20 and Toyocat® RX 21, DABCO® RP 202, DABCO® RP 204, DABCO® NE 300, DABCO® NE 310, DABCO® NE 400, DABCO® NE 500, DABCO® NE 600, DABCO® NE 650, DABCO® NE 660, DABCO® NE 740, DABCO® NE 750, DABCO® NE 1060, DABCO® NE 1080, DABCO® NE 1082 and DABCO® NE 2039, Niax® EF 860, Niax® EF 890, Niax® EF 700, Niax® EF 705, Niax® EF 708, Niax® EF 600, Niax® EF 602, Kosmos® 54, Kosmos® EF, and Tegoamin® ZE 1.

According to the application, it may be preferable that, in the inventive production of polyurethane foams, one or more nitrogen-containing and/or metallic catalysts are used. When more than one catalyst is used, the catalysts may be used in any desired mixtures with one another. It is possible here to use the catalysts individually during the foaming operation, for example in the manner of a preliminary dosage in the mixing head, and/or in the form of a premixed catalyst combination.

The expression "premixed catalyst combination", also referred to hereinafter as catalyst combination, for the purposes of this invention especially encompasses ready-made mixtures of metallic catalysts and/or nitrogenous catalysts and/or corresponding protonated and/or quaternized nitrogenous catalysts, and optionally also further ingredients or additives, for example water, organic solvents, acids for blocking the amines, emulsifiers, surfactants, blowing agents, antioxidants, flame retardants, stabilizers and/or siloxanes, preferably polyether siloxanes, which are already present as such prior to the foaming and need not be added as individual components during the foaming operation.

According to the application, it may be preferable when the sum total of all the nitrogen-containing catalysts used relative to the sum total of the metallic catalysts, especially potassium, zinc and/or tin catalysts, results in a molar ratio of 1:0.05 to 0.05:1, preferably 1:0.07 to 0.07:1 and more preferably 1:0.1 to 0.1:1.

In order to prevent any reaction of the components with one another, especially reaction of nitrogen-containing catalysts with metallic catalysts, especially potassium, zinc and/or tin catalysts, it may be preferable to store these components separately from one another and then to feed in the isocyanate and polyol reaction mixture simultaneously or successively.

Suitable use amounts of catalysts are guided by the type of catalyst and are preferably in the range from 0.005 to 10.0 pphp, more preferably in the range from 0.01 to 5.00 pphp (=parts by weight based on 100 parts by weight of polyol) or 0.10 to 10.0 pphp for potassium salts.

Preferred water contents in the process according to the invention depend on whether or not physical blowing agents are used in addition to water, the use of which is optional. In the case of purely water-blown foams, the values typically range from preferably 1 to 20 pphp; when other blowing agents are used in addition, the amount of water used typically decreases to e.g. 0 or to the range from e.g. 0.1 to 5 pphp. To achieve high foam densities, preferably neither water nor any other blowing agent is used.

Suitable, optionally usable physical blowing agents for the purposes of this invention are gases, for example liquefied $CO_2$, and volatile liquids, for example hydrocarbons of 4 or 5 carbon atoms, preferably cyclo-, iso- and n-pentane, hydrofluorocarbons, preferably HFC 245fa, HFC 134a and HFC 365mfc, but also olefinic hydrofluorocarbons such as HFO 1233zd or HFO1336mzzZ, hydrochlorofluorocarbons, preferably HCFC 141b, oxygen-containing compounds such as methyl formate and dimethoxymethane, or hydrochlorocarbons, preferably dichloromethane and 1,2-dichloroethane. Suitable blowing agents further include ketones (e.g. acetone) or aldehydes (e.g. methylal).

In addition to or in lieu of any water and any physical blowing agents, it is also possible to use other chemical blowing agents that react with isocyanates with gas evolution, examples being formic acid, carbamates or carbonates.

Suitable stabilizers against oxidative degradation, known as antioxidants, preferably include all common free-radical scavengers, peroxide scavengers, UV absorbers, light stabilizers, complexing agents for metal ion impurities (metal deactivators). Preference is given to using compounds of the following classes of substances, or classes of substances containing the following functional groups, with substituents on the respective parent molecules preferably being, in particular, substituents which have groups which are reactive toward isocyanate: 2-(2'-hydroxyphenyl)benzotriazoles, 2-hydroxybenzophenones, benzoic acids and benzoates, phenols, in particular comprising tert-butyl and/or methyl substituents on the aromatic entity, benzofuranones, diarylamines, triazines, 2,2,6,6-tetramethylpiperidines, hydroxylamines, alkyl and aryl phosphites, sulfides, zinc carboxylates, diketones. Phenols may, for example, be esters based on 3-(4-hydroxyphenyl)propionic acid such as triethylene glycol bis[3-(3-tert-butyl-4-hydroxy-5-methylphenyl)propionate], octadecyl 3-(3,5-di-tert-butyl-4-hydroxyphenyl)propionate, or methylenediphenols such as 4,4'-butylidenebis (6-tert-butyl-3-methylphenol). Preferred 2-(2'-hydroxyphenyl)benzotriazoles are, for example, 2-(2'-hydroxy-5'-methylphenyl)benzotriazole or 2-(2'-hydroxy-3',5'-di-tert-butylphenyl)benzotriazole. Preferred 2-hydroxybenzophenones are, for example, 2-hydroxy-4-n-octoxybenzophenone, 2,2',4,4'-tetrahydroxybenzophenone or 2,4-dihydroxybenzophenone. Preferred benzoates are, for example, hexadecyl 3,5-di-tert-butyl-4-hydroxybenzoate or tannins.

Suitable flame retardants in the context of this invention are all substances which are regarded as suitable for this purpose according to the prior art. Preferred flame retardants are, for example, liquid organophosphorus compounds such as halogen-free organophosphates, e.g. triethyl phosphate (TEP), halogenated phosphates, for example tris(1-chloro-2-propyl) phosphate (TCPP) and tris(2-chloroethyl) phosphate (TCEP), and organic phosphonates, for example dimethyl methanephosphonate (DMMP), dimethyl propanephosphonate (DMPP), or solids such as ammonium polyphosphate (APP) and red phosphorus. Suitable flame retardants further include halogenated compounds, for example halogenated polyols, and also solids such as expandable graphite and melamine.

Biocides used may, for example, be commercial products such as chlorophene, benzisothiazolinone, hexahydro-1,3,5-tris(hydroxyethyl-s-triazine), chloromethylisothiazolinone, methylisothiazolinone or 1,6-dihydroxy-2,5-dioxohexane, which are known by the trade names BIT 10, Nipacide BCP, Acticide MBS, Nipacide BK, Nipacide CI, Nipacide FC.

The foam properties of PU foams can be influenced in the course of production thereof especially using siloxanes or organomodified siloxanes, for which it is possible to use the substances cited in the prior art. Preference is given to using compounds that are particularly suitable for the respective PU foam types (rigid PU foams, hot-cure flexible PU foams, viscoelastic PU foams, ester-type PU foams, cold-cure flexible PU foams (HR PU foams), semirigid PU foams). Suitable (organomodified) siloxanes are described for example in the following documents: EP 0839852, EP 1544235, DE 102004001408, EP 0839852, WO 2005/118668, US 20070072951, DE 2533074, EP 1537159, EP 533202, U.S. Pat. No. 3,933,695, EP 0780414, DE 4239054, DE 4229402, EP 867465. These compounds may be prepared as described in the prior art. Suitable examples are described, for instance, in U.S. Pat. No. 4,147,847, EP 0493836 and U.S. Pat. No. 4,855,379.

The SiOC-bonded polyether siloxanes having branching in the siloxane moiety, prepared from branched siloxanes bearing acetoxy groups, that are to be used in accordance with the invention act as foam stabilizers. Additional foam stabilizers used may be any stabilizers known from the prior art. There accordingly follows a description firstly of the additionally usable foam stabilizers, the use of which is optional:

Preference is given to using, as additional foam stabilizers, those based on polydialkylsiloxane-polyoxyalkylene copolymers, as generally used in the production of urethane foams. The structure of these compounds is preferably such that, for example, a long-chain copolymer of ethylene oxide and propylene oxide is bonded to a polydimethylsiloxane radical. The linkage between the polydialkylsiloxane and the polyether moiety may be via an SiC linkage or an Si—O—C bond. In structural terms, the polyether or the different polyethers may be bonded to the polydialkylsiloxane in terminal or lateral positions. The alkyl radical or the various alkyl radicals can here be aliphatic, cycloaliphatic or aromatic. Methyl groups are very particularly advantageous.

The polydialkylsiloxane may be linear or else contain branches. Suitable foam stabilizers are described, for example, in the following documents: EP 0839852, EP 1544235, DE 102004001408, WO 2005/118668, US 2007/0072951, DE 2533074, EP 1537159 EP 533202, U.S. Pat. No. 3,933,695, EP 0780414, DE 4239054, DE 4229402, EP 867465. The corresponding silicon compounds may be prepared as described in the prior art. Suitable examples are described, for instance, in U.S. Pat. No. 4,147,847, EP 0493836 and U.S. Pat. No. 4,855,379. Suitable stabilizers can be purchased from Evonik Industries AG under the TEGOSTAB® trade name.

Suitable siloxanes that may additionally be used especially have the following structure:

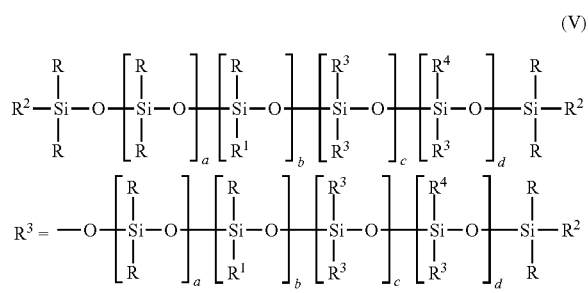

(V)

in which
a is independently 0 to 500, preferably 1 to 300 and especially 2 to 150,
b is independently 0 to 60, preferably 1 to 50 and especially 1 to 30,
c is independently 0 to 10, preferably 0 or >0 to 5,
d is independently 0 to 10, preferably 0 or >0 to 5,
with the proviso that, for each molecule of the formula (V), the mean number $\Sigma d$ of T units [SiR$^3$R$^4$O] and the mean number $\Sigma c$ of Q units [SiR$^3$R$^3$O] per molecule is not greater than 50 in either case, the mean number $\Sigma a$ of D units [SiRRO] per molecule is not greater than 2000 and the mean number $\Sigma b$ of the siloxy units bearing R$^1$ per molecule is not greater than 100,
R is independently at least one radical from the group of linear, cyclic or branched, aliphatic or aromatic, saturated or unsaturated hydrocarbon radicals having 1 up to 20 carbon atoms, but is preferably a methyl radical,
R$^2$ is independently R$^1$ or R,
R$^1$ is different from R and is independently an organic radical and/or a polyether radical, R$^1$ preferably being a radical selected from the group of —CH$_2$—CH$_2$—CH$_2$—O—(CH$_2$—CH$_2$O—)$_x$—(CH$_2$—CH(R')O—)$_y$—R"

—CH$_2$—CH$_2$—O—(CH$_2$—CH$_2$O—)$_x$—(CH$_2$—CH(R')O—)$_y$—R"

—O—(C$_2$H$_4$O—)$_x$—(C$_3$H$_5$O—)$_y$—R'

—CH$_2$—R$^{IV}$

—CH$_2$—CH$_2$—(O)$_x$—R$^{IV}$

—CH$_2$—CH$_2$—CH$_2$—O—CH$_2$—CH(OH)—CH$_2$OH

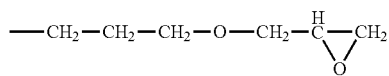

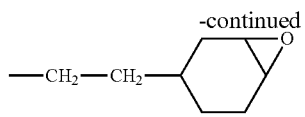

or

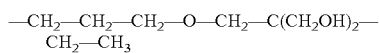

in which
x=0 to 100, preferably >0, especially 1 to 50,
x'=0 or 1,
y=0 to 100, preferably >0, especially 1 to 50,
z=0 to 100, preferably >0, especially 1 to 10,
R' is independently an optionally substituted alkyl or aryl group having 1 to 12 carbon atoms, substituted, for example, by alkyl radicals, aryl radicals or haloalkyl or haloaryl radicals, where different R' substituents may be present within any R$^1$ radical and/or any molecule of the formula (V), and
R" is independently a hydrogen radical or an alkyl group having 1 to 4 carbon atoms, a —C(O)—R'" group with R'"=alkyl radical, a —CH—O—R' group, an alkylaryl group, for example a benzyl group, the —C(O)NH—R' group,
R$^{IV}$ is a linear, cyclic or branched hydrocarbyl radical which also has further substitution, for example substitution by halogens, and has 1 to 50, preferably 9 to 45, more preferably 13 to 37, carbon atoms,
R$^4$ may independently be R, R$^1$ and/or a functionalized, organic, saturated or unsaturated radical having substitution by heteroatoms, selected from the group of the alkyl, aryl, chloroalkyl, chloroaryl, fluoroalkyl, cyanoalkyl, acryloyloxyaryl, acryloyloxyalkyl, methacryloyloxyalkyl, methacryloyloxypropyl or vinyl radical,
with the proviso that at least one substituent from R$^1$, R$^2$ and R$^4$ is not R. The various monomer units in the structural units specified in the formulae (siloxane chains and/or polyoxyalkylene chain) may take the form of alternating blocks with any number of blocks in any sequence or be subject to a random distribution. The indices used in the formulae should be regarded as statistical averages.

The siloxanes of the formula (V) can be prepared by known methods, for example the noble metal-catalysed hydrosilylation reaction of compounds containing a double bond with corresponding hydrosiloxanes, as described, for example, in EP 1520870. The document EP 1520870 is hereby incorporated by reference and is considered to form part of the disclosure-content of the present invention.

Compounds having at least one double bond per molecule used may, for example, be α-olefins, vinyl polyoxyalkylenes and/or allyl polyoxyalkylenes. Preference is given to using vinyl polyoxyalkylenes and/or allyl polyoxyalkylenes. Particularly preferred vinyl polyoxyalkylenes are, for example, vinyl polyoxyalkylenes having a molar mass in the range from 100 g/mol to 8000 g/mol, which may be formed from the monomers propylene oxide, ethylene oxide, butylene oxide and/or styrene oxide in blocks or in random distribution, and which may either be hydroxy-functional or end-capped by a methyl ether function or an acetoxy function. Particularly preferred allyl polyoxyalkylenes are, for example, allyl polyoxyalkylenes having a molar mass in the range from 100 g/mol to 5000 g/mol, which may be formed from the monomers propylene oxide, ethylene oxide, butylene oxide and/or styrene oxide in blocks or in random distribution, and which may either be hydroxy-functional or end-capped by a methyl ether function or an acetoxy function. Particular preference for use as compounds having at least one double bond per molecule is given to the exemplified α-olefins, allyl alcohol, 1-hexenol, vinylpolyoxyalkylenes and/or allylpolyoxyalkylenes and also allyl glycidyl ether and vinylcyclohexene oxide.

In the context of the present invention, preference is given to using optional siloxanes of the formula (V) in which a is independently 1 to 300, b is independently 1 to 50, c is independently 0 to 4, d is independently 0 to 4, with the proviso that, for each molecule of the formula (V), the mean number Σd of T units and the mean number Σc of Q units per molecule is not greater than 20, the mean number Σa of D units per molecule is not greater than 1500 and the mean number Σb of $R^1$-bearing siloxy units per molecule is not greater than 50.

In a particularly preferred embodiment of the present invention, siloxanes of the formula (V) are used in which $R^1$ is independently an organic radical

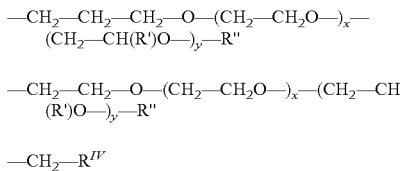

in which x is 0 to 100, preferably >0, especially 1 to 50, and y is 0 to 100, preferably >0, especially 1 to 50, and R' may independently be different from one another and represents methyl, ethyl and/or phenyl radicals. R" is independently a hydrogen radical or an alkyl group of 1 to 4 carbon atoms, a —C(O)—R''' group with R'''=alkyl radical, a —CH$_2$—O—R' group, an alkylaryl group, for example a benzyl group, the —C(O)NH—R' group, $R^{IV}$ is a linear, cyclic or branched, optionally substituted, for example halogen-substituted, hydrocarbyl radical of 1 to 50, preferably 9 to 45 and more preferably 13 to 37 carbon atoms.

In a further preferred embodiment of the present invention, preferably for production of rigid foams, siloxanes of the formula (V) are used in which $R^1$ is independently an organic radical selected from the group comprising —CH$_2$—CH$_2$—CH$_2$—O—(CH$_2$—CH$_2$O—)$_x$—(CH$_2$—CH(R')O—)$_y$—R" and/or —CH$_2$—CH$_2$—O—(CH$_2$—CH$_2$O—)$_x$—(CH$_2$—CH(R')O—)$_y$—R" and/or

—CH$_2$—$R^{IV}$, in which x is 0 to 100, preferably >0, especially 1 to 50, y is 0 to 100, preferably >0, especially 1 to 50, R' is methyl and R" is independently a hydrogen radical or an alkyl group of 1 to 4 carbon atoms, a C(O)—R''' group with R'''=alkyl radical, a —CH2-O—R' group, an alkylaryl group, for example a benzyl group, the C(O)NH—R' group, where the molar proportion of oxyethylene units accounts for at least 70% of the oxyalkylene units, based on the total amount of oxyalkylene units, i.e. x/(x+y)>0.7. With this prerequisite, it is preferable that, in addition, the polyoxyalkylene chain bears a hydrogen at its end. With these prerequisites, in a further preferred embodiment of the invention (especially in the context of the inventive use), siloxanes of the formula (V) are used in which the oxyalkylene units present in the $R^1$ radical are exclusively oxyethylene units and, at the same time, the R" radical is not a hydrogen.

In a further preferred embodiment of the present invention, preferably for production of flexible slabstock foams, siloxanes of the formula (V) are used in which R1 is independently an organic radical selected from the group comprising —CH$_2$—CH$_2$—CH$_2$—O—(CH$_2$—CH$_2$O—)$_x$—(CH$_2$—CH(R')O—)$_y$—R" and/or

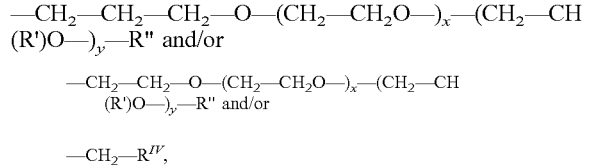

in which x is 0 to 100, preferably >0, especially 1 to 50, y is 0 to 100, preferably >0, especially 1 to 50, R' is methyl and R" is independently a hydrogen radical or an alkyl group having 1 to 4 carbon atoms, a C(O)—R''' group with R'''=alkyl radical, a —CH2-O—R' group, an alkylaryl group, for example a benzyl group, the C(O)NH—R' group, where the molar proportion of oxyethylene units based on the total amount of oxyalkylene units accounts for not more than 60% of the oxyalkylene units, i.e. x/(x+y)<0.6.

In a further preferred embodiment of the present invention, siloxanes of the formula (V) that were hydrosilylated with inclusion of olefins are used, as a result of which $R^1$ consists to an extent of at least 10 mol %, preferably to an extent of at least 20 mol % and more preferably to an extent of at least 40 mol % of CH$_2$—$R^{IV}$ where $R^{IV}$ is a linear or branched hydrocarbon having 9 to 17 carbon atoms.

A further preferred embodiment of the present invention (especially in the context of the inventive use) uses siloxanes of the formula (V) in which the terminal positions, also called the alpha and omega positions, in the siloxane are at least partly functionalized with $R^1$ radicals. In this case, at least 10 mol %, preferably at least 30 mol % and more preferably at least 50 mol % of the terminal positions are functionalized with $R^1$ radicals.

In a particularly preferred embodiment of the invention, siloxanes of the formula (V) in which a statistical average of not more than 50%, preferably not more than 45%, more preferably not more than 40%, of the total mean molar mass of the siloxane is accounted for by the cumulative molar mass of all the identical or different $R^1$ radicals in the siloxane are used.

In a further preferred embodiment of the present invention, siloxanes of the formula (V) are used in which the R radical is methyl and the structural elements having the index a are present in a greater number than the structural elements having the index b, in such a way that the quotient a/b is at least equal to seven, preferably greater than 10, more preferably greater than 12.

In a further preferred embodiment of the present invention, siloxanes of the formula (V) are used in which the oxyalkylene units present in the $R^1$ radical are exclusively oxyethylene units and, at the same time, the R" radical is not a hydrogen.

The preceding part described the foam stabilizers usable in addition that are optionally usable.

The process according to the invention is effected using SiOC-bonded polyether siloxanes (e) having branching in the siloxane moiety, prepared from branched siloxanes (f) bearing acetoxy groups.

The provision of (e) and (f) is described hereinafter.

Routes to branched siloxanes bearing acetoxy groups have been described in the patent literature. The as-yet unpublished European patent applications having the application reference numbers EP18172882.5, EP18172876.7, EP17195510.7, EP17204277.2, EP18189073.2 and EP 18210035.4 are dedicated to the preparation of trifluoromethanesulfonic acid-modified, equilibrated acetoxysiloxanes of the branched structural type.

Following the teaching of EP 18189073.2, for example, cyclic siloxanes, especially comprising $D_4$ and/or $D_5$, and/or mixtures of cyclic branched siloxanes of the D/T type are reacted with acetic anhydride, with use of trifluoromethanesulfonic acid as catalyst and with addition of acetic acid. In addition, EP 18189073.2 states that both mixtures of cyclic branched siloxanes of the D/T type which consist of siloxanes comprising D and T units and wherein the cumulative proportion of D and T units having Si-alkoxy and/or SiOH groups that are present in the siloxane matrix, determinable by $^{29}$Si NMR spectroscopy, is less than 2 mole percent, preferably less than 1 mole percent, and which advantageously further contain at least 5% by weight of siloxane cycles, such as preferably octamethylcyclotetrasiloxane ($D_4$), decamethylcyclopentasiloxane ($D_5$) and/or mixtures thereof, and mixtures of cyclic branched siloxanes having D and T units, wherein the cumulative proportion of D and T units having Si-alkoxy and/or SiOH groups that are present in the siloxane matrix, determinable by $^{29}$Si NMR spectroscopy, is greater than 2 and less than 10 mole percent, are of particularly good suitability for the preparation of end-equilibrated siloxanes of the branched structure type that have acetoxy functions.

The as-yet unpublished European application document EP 18210035.4 likewise describes (i) reaction systems for preparation of siloxanes bearing acetoxy functions, comprising a) silanes and/or siloxanes bearing alkoxy groups and/or b) silanes and/or siloxanes bearing acetoxy groups, c) silanes and/or siloxanes bearing hydroxy groups, d) optionally simple siloxane cycles and/or DT cycles, e) a reaction medium comprising acetic anhydride, perfluoroalkanesulfonic acid and preferably acetic acid, (ii) a process for producing branched siloxanes bearing acetoxy functions. According to that application, it is for example possible to arrive at a branched siloxane bearing terminal acetoxy groups by reacting a branched silicone equilibrate (=pre-equilibrate) bearing terminal alkoxy groups as sole reactant with a reaction medium consisting of acetic anhydride, trifluoromethanesulfonic acid and acetic acid.

Branched siloxanes (f) bearing acetoxy groups may especially be obtained from the reaction of
i) silanes and/or siloxanes bearing alkoxy groups, and/or
ii) silanes and/or siloxanes bearing hydroxy groups, and/or
iii) simple siloxane cycles and/or DT cycles, with acetic anhydride, superacid, especially trifluoromethanesulfonic acid, and acetic acid. This corresponds to a preferred embodiment of the invention.

Superacids in the context of the invention are those acids having a pKa of less than −3.0, preferably fluorinated and/or perfluorinated sulfonic acids, fluorosulfonic acid $HSO_3F$, fluoroantimonic acid $HSbF_6$, perfluorobutanesulfonic acid $C_4F_9SO_3H$ and/or most preferably trifluoromethanesulfonic acid $CF_3SO_3H$.

In particular, in the context of the present invention, it is possible to use a silane and/or siloxane bearing alkoxy groups and containing at least one T and/or Q group, and/or DT cycles. This corresponds to a preferred embodiment of the invention.

In a preferred embodiment of the invention, for preparation of the branched siloxanes bearing acetoxy groups, acetic acid is added in amounts of 0.4 to 3.5 percent by weight, with preference 0.5 to 3 percent by weight, preferably 0.8 to 1.8 percent by weight, more preferably in amounts of 1.0 to 1.5 percent by weight, based on the reaction matrix.

The superacid catalyst, especially trifluoromethanesulfonic acid, in a preferred embodiment of the invention for preparation of the branched siloxanes bearing acetoxy groups, is used in amounts of 0.1 to 1.0 percent by mass, preferably 0.1 to 0.3 percent by mass, based on the reaction matrix.

In the context of the present invention, particular preference is given to the use of end-equilibrated siloxanes of the branched structure type that have acetoxy functions.

What is meant by the term "end-equilibrated" is that the equilibrium established at a temperature of 23° C. and a pressure of 1013.25 hPa has been attained. The indicator used for the attainment of the equilibrium may be the total cycles content determined by gas chromatography and defined as the sum total of the $D_4$, $D_5$ and $D_6$ contents, based on the siloxane matrix and ascertained after derivatization of the α☐ω-diacetoxypolydimethylsiloxanes to give the corresponding α☐ω-diisopropoxypolydimethylsiloxanes or after the derivatization of the branched acetoxysiloxanes to give the corresponding branched isopropoxysiloxanes. The aforementioned use of acetic acid makes it readily possible here for equilibrium contents to be below the about 8 percent by weight which is otherwise typical for the total cycles content in the branched acetoxysiloxanes. It is accordingly a preferred embodiment when equilibrium contents of the total cycles content are below 8 and preferably 7 percent by weight in the branched acetoxysiloxanes. The derivatization to give the branched isopropoxysiloxanes is deliberately chosen here in order to prevent a thermally induced retro-cleavage reaction of the branched acetoxysiloxanes that may take place under the conditions of gas chromatography analysis (with regard to the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, 0-Metal Derivates of Organic Hydroxy Compounds p. 162 ff)).

The provision of the branched siloxanes bearing acetoxy groups is shown by way of example in the Examples.

In a preferred embodiment of the invention, SiOC-bonded polyether siloxanes (e) having branching in the siloxane moiety are provided by reacting the branched siloxanes (f) bearing acetoxy groups with polyetherols. This is shown by way of example in the Examples.

If the reaction of the branched siloxanes (f) bearing acetoxy groups with polyetherols is effected in the presence of at least one base, especially in the presence of sodium hydrogencarbonate, ammonia or an organic amine, this is a preferred embodiment of the invention.

If this aforementioned reaction of the branched siloxanes (f) bearing acetoxy groups with polyetherols using an inert solvent is preferably effected using a solvent that is inert and at the same time forms an azeotrope with acetic acid formed and possibly already present, wherein the inert solvent is advantageously an aromatic, preferably alkylaromatic, solvent and most preferably toluene, this is a further preferred embodiment of the invention.

If the reaction of the branched siloxanes (f) bearing acetoxy groups with polyetherols is effected in a solvent-free manner, this is a further preferred embodiment of the invention.

The aforementioned reaction results in SiOC-bonded polyether siloxanes having branching in the siloxane moiety that can be used in the context of this invention.

The branched SiOC-bonded polyether siloxane (e) has identical or different polyether radicals.

If the SiOC-bonded polyether siloxane (e) having branching in the siloxane moiety comprises identical or different polyether radicals, where the polyether radicals especially satisfy the following formula (III):

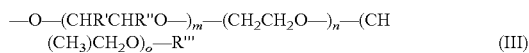

(III)

with
- R' is hydrogen, a saturated alkyl group having 1-18 carbon atoms or an aromatic radical, or preferably a methyl or ethyl group or a phenyl radical,
- R" is hydrogen, a saturated alkyl group having 1-18 carbon atoms or an aromatic radical, or preferably a methyl or ethyl group or a phenyl radical,
- R''' is identical or different, saturated or unsaturated alkyl radicals having 1-18 carbon atoms, preferably 1-12 carbon atoms, more preferably 1-4 carbon atoms,
- m=0 up to 250, preferably 0 up to 100, more preferably 0 up to 50,
- n=0 up to 250, preferably 3 up to 100, more preferably 5 up to 50,
- o=0 up to 250, preferably 3 up to 100, more preferably 5 up to 50,
- with the proviso that the sum total of m, n and o is equal to or greater than 3, this is a preferred embodiment of the invention.

The invention further provides a composition for use in the production of PU foams, especially of flexible PU foam, HR PU foam, hypersoft PU foam or viscoelastic PU foam, characterized in that it comprises SiOC-bonded polyether siloxanes having branching in the siloxane moiety, prepared from branched siloxanes bearing acetoxy groups, especially according to the provisions as set out above for the preparation of SiOC-bonded polyether siloxanes having branching in the siloxane moiety.

In the context of the present invention, the siloxanes may also be used as part of compositions with different carrier media. Useful carrier media include, for example, glycols, for example monoethylene glycol (MEG), diethylene glycol (DEG), propylene glycol (PG) or dipropylene glycol (DPG), alkoxylates or oils of synthetic and/or natural origin.

In a preferred embodiment of the invention, the aforementioned composition for use in the production of PU foams comprises carrier media, especially as specified above.

Preference is given to producing the PU foams by adding a sufficient amount of siloxane that the proportion by mass of total siloxane based on the resulting polyurethane foam is from 0.0001% to 10% by weight, preferably 0.01% to 6% by weight, especially 0.1% to 5% by weight.

In a preferred embodiment, the PU foams according to the invention or produced in accordance with the invention are open-cell PU foams, especially flexible PU foams, more preferably hot-cure flexible PU foams. In the context of the present invention, "open-cell" means that a foam has good air permeability (=porosity). The air permeability of the foam can be determined by dynamic pressure measurement on the foam. The dynamic pressure can be measured on the basis of EN 29053. When the measured dynamic pressure is reported in mm of water column, open-cell PU foams, especially flexible PU foams, have a dynamic pressure of preferably below 100 mm, more preferably ≤50 mm of water column, as determined by the method of measurement described in the examples.

The inventive production of PU foams can be effected by any methods familiar to the person skilled in the art, for example by manual mixing or preferably with the aid of high-pressure or low-pressure foaming machines. The process according to the invention may be performed continuously or batchwise. Batchwise performance of the process is preferable in the production of moulded foams, refrigerators, footwear soles or panels. A continuous process is preferable to produce insulation panels, metal composite elements, slabs or for spraying techniques.

A particularly preferred composition for production of polyurethane or polyisocyanurate foam in the context of the present invention has a density of preferably 5 to 800, especially 5 to 300, more preferably 5 to 150 and especially preferably of 10 to 90 kg/m$^3$, and especially has the following composition:

| Component | Proportion by weight |
|---|---|
| Polyol | 100 |
| (Amine) catalyst | 0.05 to 5 |
| Potassium trimerization catalyst | 0 to 10 |
| Siloxane (total) | 0.01 to 25, preferably 0.1 to 20 |
| Water | 0 to <25, preferably 0.1 to 15 |
| Blowing agent | 0 to 130 |
| Flame retardant | 0 to 70 |
| Fillers | 0 to 150 |
| Further additives | 0 to 20 |
| Isocyanate index: | greater than 15 |

In a preferred embodiment of the invention, it is a feature of the process that the PU foam is a rigid PU foam, a flexible PU foam, a viscoelastic PU foam, an HR PU foam, a hypersoft PU foam, a semirigid PU foam, a thermoformable PU foam or an integral PU foam, preferably a flexible PU foam, HR PU foam, hypersoft PU foam or viscoelastic PU foam.

In a preferred embodiment of the invention, the reaction to produce the PU foams is effected using
- g) water, and/or
- h) one or more organic solvents, and/or
- i) one or more stabilizers against oxidative degradation, especially antioxidants, and/or
- j) one or more flame retardants, and/or
- k) further foam stabilizers other than component (e), based on siloxanes and/or polydialkylsiloxane-polyoxyalkylene copolymers, and/or
- l) one or more further additives, preferably selected from the group of the surfactants, biocides, dyes, pigments, fillers, antistatic additives, crosslinkers, chain extenders, cell openers and/or fragrances.

The invention further provides a polyurethane foam, preferably rigid PU foam, flexible PU foam, viscoelastic PU foam, HR PU foam, hypersoft PU foam, semirigid PU foam, thermoformable PU foam or integral PU foam, preferably flexible PU foam, HR PU foam or viscoelastic PU foam, which is obtainable by a process as described above.

The invention further provides for the use of PU foams as described above as refrigerator insulation, insulation panel, sandwich element, pipe insulation, spray foam, 1- and 1.5-component can foam, imitation wood, modelling foam, floral foam, packaging foam, mattress, furniture cushion, mouldable foam for furniture, pillows, rebonded foam, sponge foam, automobile seat cushion, headrest, dashboard, automobile interior trim, automobile roof liner, sound absorption material, steering wheel, footwear sole, carpet backing foam, filter foam, sealing foam, sealant and adhesive, or for production of corresponding products.

The invention further provides for the use of SiOC-bonded polyether siloxanes having branching in the siloxane moiety, prepared from branched siloxanes bearing acetoxy groups, especially as described above, for production of PU foams, preferably flexible PU foam, HR PU foam, hypersoft PU foam or viscoelastic PU foam, having low odor and/or ageing resistance.

The invention further provides for the use of SiOC-bonded polyether siloxanes having branching in the siloxane moiety, prepared from branched siloxanes bearing acetoxy groups, especially as described above, for production of PU foams, preferably flexible PU foam, HR PU foam, hypersoft PU foam or viscoelastic PU foam, having low emissions with respect to aldehyde, preferably comprising emissions of formaldehyde, acetaldehyde, propionaldehyde, acrolein and benzaldehyde, especially propionaldehyde.

A person skilled in the art is aware of different analytical methods for determining aldehyde emissions. VDA 275, VDA 277 or else VDA 278 may be cited by way of example, as may various chamber test methods. VDA is the German Association of the Automotive Industry (www.vda.de). "VDA 275" provides a method of measurement for determining the formaldehyde release by the modified bottle procedure.

The process according to the invention can produce polyurethane foams that are particularly low in emissions of aldehyde. The invention thus also enables a process for producing polyurethane foams with lowering of total aldehyde emission from the resulting foams, preferably comprising emissions of formaldehyde, acetaldehyde, propionaldehyde, acrolein, and also aromatic aldehydes, such as benzaldehyde, advantageously aldehyde emissions comprising formaldehyde, propionaldehyde, acetaldehyde, acrolein and benzaldehyde, especially aldehyde emissions comprising formaldehyde, propionaldehyde and acetaldehyde from polyurethane systems (especially polyurethane foams).

The PU foams produced by the process according to the invention can be analysed for their formaldehyde, acetaldehyde and propionaldehyde content in accordance with VDA 275 (VDA 275 "Formteile für den Fahrzeuginnenraum—Bestimmung der Formaldehydabgabe" [Mouldings for the Automotive Interior—Determination of Formaldehyde Release], measured by the modified bottle method; source: VDA 275, July 1994, www.vda.de). For the determination of the benzaldehyde content, it is especially possible to use VDA 278 in the October 2011 version (Editor: VERBAND DER AUTOMOBILINDUSTRIE E. V. (VDA); Behrenstr. 35; 10117 Berlin; www.vda.de).

The principles of measurement in this regard are elucidated hereinafter:

VDA 275
Principle of Measurement

In the method, test specimens having a certain mass and size are secured above distilled water in a closed 1 l glass bottle and stored for a defined period at constant temperature. The bottles are subsequently cooled down and the absorbed formaldehyde is determined in the distilled water. The amount of formaldehyde determined is based on the dry weight of the moulding (mg/kg).

Analysis
Test Specimen: Sample Preparation, Sampling and Specimen Dimensions

After the foams have been demoulded, they are stored at 21° C. and about 50% relative humidity for 24 hours. Samples of the moulding are then taken at suitable and representative sites distributed uniformly across the width of the (cooled) moulding. The foams are then wrapped in aluminium foil and sealed in a polyethylene bag.

The samples each have a size of 100×40×40 mm thickness (about 9 g). For each moulding, 3 test specimens are taken for the determination of formaldehyde.

Test Procedure: Aldehyde Release

The sealed samples are sent for direct determination immediately after receipt. The samples are weighed on an analytical balance to an accuracy of 0.001 g before analysis. A 50 ml quantity of distilled water is pipetted into each of the glass bottles used. The samples are introduced into the glass bottle, and the vessel is sealed and kept at a constant temperature of 60° C. in a thermal cabinet for 3 hours. The vessels are removed from the thermal cabinet after the test period. After standing at room temperature for 60 minutes, the samples are removed from the test bottle. This is followed by derivatization by the DNPH method (dinitrophenylhydrazine). For this, 900 µl of the aqueous phase is admixed with 100 µl of a DNPH solution. The DNPH solution is prepared as follows: 50 mg of DNPH in 40 ml of MeCN (acetonitrile) is acidulated with 250 µl of dilute HCl (1:10) and made up to 50 ml with MeCN. On completion of derivatization, a sample is analysed by means of HPLC. Separation into the individual aldehyde homologues is effected.

HPLC Instrument Parameters
The following instrument is used for the analysis:
Agilent Technologies 1260
Chromatography column: Phenomenex Luna 250*4.6 mm C18, 5µ particle size
Eluent: water acetonitrile gradient
Detection: UV 365 nm VDA 278
Principle of Measurement The materials are characterized with regard to the type and the amount of the organic substances outgassable therefrom. To this end, two semi-quantitative empirical values are determined to estimate the emission of volatile organic compounds (VOC value) and also the proportion of condensable substances (fogging value). Individual substances of the emission are also determined. In the analysis, the samples are thermally extracted and the emissions are separated by gas chromatography and detected by mass spectrometry. The overall concentrations thus obtained for the VOC fraction are arithmetically converted into toluene equivalents and provide the VOC value as a result, the FOG fraction is represented in hexadecane equivalents and provides the FOG value.

The analytical method serves to determine emissions from non-metallic materials used for moulded parts in motor vehicles, they also include foams.

In thermal desorption analysis (TDS), small amounts of material are heated up in a desorption tube in a defined manner and the volatile substances which are emitted in the course of heating are cryofocused by means of an inert gas stream in a cold trap of a temperature-programmable vaporizer. After the heating phase has ended, the cold trap is rapidly heated to 280° C. The focused substances vaporize in the process. They are subsequently separated in the gas-chromatographic separation column and detected by mass spectrometry. Calibration with reference substances permits a semi-quantitative estimate of the emission, expressed in "µg/g". The quantitative reference substances used are toluene for the VOC analysis (VOC value) and n-hexadecane for the fogging value. Signal peaks can be assigned to substances using their mass spectra and retention indices. Source: VDA 278/10.2011, www.vda.de The benzaldehyde amount determined is based on toluene equivalents (µg/g).

Analysis

Test Specimen: Sample Preparation, Sampling and Specimen Dimensions

After the foams have been demoulded, they are stored at 21° C. and about 50% relative humidity for 24 hours. Samples of the moulding are then taken at suitable and representative sites distributed uniformly across the width of the (cooled) moulding. The foams are then wrapped in aluminium foil and sealed in a polyethylene bag.

The amount of the foam samples introduced into the desorption tubes is 10-15 mg in each case.

Test Procedure: VOC/FOG Thermal Desorption

The sealed samples are sent for direct determination immediately after receipt. The samples are weighed out on an analytical balance to an accuracy of 0.1 mg before starting the analysis and the corresponding amount of foam is placed centrally in the desorption tube. A helium stream is passed over the sample and the latter heated to 90° C. for 30 minutes. All volatile substances are collected in a cold trap cooled with liquid nitrogen. After 30 minutes the cold trap is heated to 280° C. The vaporizing substances are separated from one another using the described gas chromatography column and then analysed by mass spectroscopy.

GC MS instrument parameters.

The following instrument was used for the analysis:
Supplier: Gerstel
D 45473 Mühlheim an der Ruhr,
Eberhard-Gerstel-Platz 1 TDS-3/KAS-4
Tenax® desorption tube
Agilent Technologies 7890A (GC)/5975C (MS)
Column: HP Ultra2 (50 m, 0.32 mm, 0.52 µm)
Carrier Gas: Helium Foaming results showed that the process according to the invention enables the provision of PU foams having reduced aldehyde emissions, such as preferably formaldehyde, acetaldehyde and propionaldehyde, especially propionaldehyde.

The examples adduced hereinafter illustrate the present invention by way of example, without any intention of restricting the invention, the scope of application of which is apparent from the entirety of the description and the claims, to the embodiments specified in the examples.

EXAMPLES

Raw Materials:
DT Resin:

The DT resin was prepared as follows and used without further processing. In a 500 ml four-neck round-bottom flask with a precision glass stirrer and a reflux condenser on top, 52.2 g (0.293 mol) of methyltriethoxysilane was heated to 60° C. together with 130.3 g (0.351 mol) of decamethylcyclopentasiloxane in 200 ml of toluene while stirring, 0.400 g of trifluoromethanesulfonic acid was added and the mixture was equilibrated for 4 hours. Then 15.8 g of water and 4.0 g of ethanol were added and the mixture was heated to reflux temperature at about 80° C. for a further 4 hours. The reflux condenser was exchanged for a distillation system, and the constituents that are volatile up to 100° C. were distilled off within the next hour. Then the distillation system was replaced by a reflux condenser, 7.90 g of water and 2.0 g of ethanol were added to the mixture, and the mixture was left to boil for a further hour. The reflux condenser was then replaced once again by a distillation system, and the constituents that were volatile up to 100° C. were removed over the course of the next hour. The mixture was cooled to 60° C. and then 4 m % of sodium hydrogencarbonate was added, the mixture was stirred for half an hour, then the salt was separated from the liquid phase with the aid of a fluted filter. The volatiles were distilled off at 70° C. and a pressure of <1 mbar on a rotary evaporator, and a colorless mobile liquid was isolated, the $^{29}$Si NMR spectrum of which indicated a D/T ratio of 5.85:1.

Decamethylcyclopentasiloxane (CAS: 541-02-6), methyltriethoxysilane (CAS: 2031-67-6), acetic anhydride (CAS: 108-24-7), trifluoromethanesulfonic acid (≥99%, CAS: 1493-13-6) and acetic acid (≥99%, CAS: 64-19-7) were sourced from Aldrich and used without further purification.

Example 1 a) Preparation of Branched Acetoxysiloxane

An initial charge of 107 g of DT resin having a D/T ratio of 5.85:1 together with 115.8 g of decamethylcyclopentasiloxane in a 500 ml three-neck flask under protective gas was stirred with the aid of a precision glass stirrer. Added to this mixture were 31.1 g of acetic anhydride, 3.8 g of acetic acid, and 0.5 g of trifluoromethanesulfonic acid. The mixture was heated to 150° C. and stirred at this temperature for six hours.

b) Preparation of an SiOC-Bonded Polyether Siloxane Having Branching in the Siloxane Moiety To an initial charge of 90.3 g of a polyether having the general formula $CH_3CH_2CH_2CH_2O(CH_2CH_2O)_{32}(CH_2CH(CH_3)O)_{32}H$ in a 250 ml three-neck flask were added 100 g of toluene and 9.7 g of the acetoxy-functional siloxane prepared in a). The mixture was stirred with the aid of a precision glass stirrer. Subsequently, $NH_3$ gas was introduced gradually until the reaction solution had a pH of 7 to 8. A white solid precipitated out. The mixture was heated to 50° C., stirred for a further 30 min and then filtered. The clear filtrate was then freed of volatiles at 130° C. and a pressure of 1 mbar.

Example 2 a) Preparation of Branched Acetoxysiloxane

An initial charge of 107 g of DT resin having a D/T ratio of 5.85:1 together with 115.8 g of decamethylcyclopentasiloxane in a 500 ml three-neck flask under protective gas was stirred with the aid of a precision glass stirrer. Added to this mixture were 31.1 g of acetic anhydride, 3.8 g of acetic acid, and 0.5 g of trifluoromethanesulfonic acid. The mixture was heated to 150° C. and stirred at this temperature for six hours.

b) Preparation of an SiOC-Bonded Polyether Siloxane Having Branching in the Siloxane Moiety To an initial charge of 120.0 g of a polyether having the general formula $CH_3CH_2CH_2CH_2O(CH_2CH_2O)_{32}(CH_2CH(CH_3)O)_{32}H$ in a 250 ml three-neck flask was added 12.9 g of the acetoxy-functional siloxane prepared in a). The mixture was stirred with the aid of a precision glass stirrer at 25° C. for one hour. Subsequently, 2.6 g of $Na_2CO_3$ was added and the mixture was heated to 60° C. The mixture was stirred for one hour. Thereafter, the mixture was heated to 130° C. and the volatile constituents were removed at a pressure of 1 mbar. Finally, the reaction mixture was filtered. 128 g of a clear, pale yellowish liquid were obtained.

Example 3 a) Preparation of Branched Acetoxysiloxane 325 g of decamethylcyclopentasiloxane and 63 g of methyltriethoxysiloxane were initially charged in a 1 l three-neck flask. The mixture was stirred with the aid of a precision glass stirrer. This was followed by addition of 104 g of acetic anhydride, 7 g of acetic acid, and 1 g of trifluoromethanesulfonic acid. The reaction mixture was heated to 150° C. Distillate obtained is removed by means of a distillation system. The mixture was stirred for five hours. The final weight was 402 g.

b) Preparation of an SiOC-Bonded Polyether Siloxane Having Branching in the Siloxane Moiety To an initial charge of 80.0 g of a polyether having the general formula $CH_3CH_2CH_2CH_2O(CH_2CH_2O)_{32}(CH_2CH(CH_3)O)_{32}H$ in a 250 ml three-neck flask were added 90 g of toluene and 8.6 g of the acetoxy-functional siloxane prepared in a). The mixture was stirred with the aid of a precision glass stirrer. Subsequently, $NH_3$ gas was introduced gradually until the reaction solution had a pH of 7 to 8. A white solid precipitated out. The mixture was heated to 50° C., stirred for a further 30 min and then filtered. The clear filtrate was then freed of volatiles at 130° C. and a pressure of 1 mbar.

Example 4 a) Preparation of Branched Acetoxysiloxane 325 g of decamethylcyclopentasiloxane and 63 g of methyltriethoxysiloxane were initially charged in a 1 l three-neck flask. The mixture was stirred with the aid of a precision glass stirrer. This was followed by addition of 104 g of acetic anhydride, 7 g of acetic acid, and 1 g of trifluoromethanesulfonic acid. The reaction mixture was heated to 150° C. Distillate obtained is removed by means of a distillation system. The mixture was stirred for five hours. The final weight was 402 g.

b) Preparation of an SiOC-Bonded Polyether Siloxane Having Branching in the Siloxane Moiety To an initial charge of 110.5 g of a polyether having the general formula $CH_3CH_2CH_2CH_2O(CH_2CH_2O)_{32}(CH_2CH(CH_3)O)_{32}H$ in a 250 ml three-neck flask was added 11.9 g of the acetoxy-functional siloxane prepared in a). The mixture was stirred with the aid of a precision glass stirrer at 25° C. for one hour. Subsequently, 2.4 g of $Na_2CO_3$ was added and the mixture was heated to 60° C. The mixture was stirred for one hour. Thereafter, the mixture was heated to 130° C. and the volatile constituents were removed at a pressure of 1 mbar. Finally, the reaction mixture was filtered. A clear, pale yellowish liquid was obtained.

Example 5 (Non-Inventive)

a) Preparation of Chlorosiloxane

The branched chlorosiloxane was prepared in a known manner, by mixing 854 g of decamethylcyclopentasiloxane with 140 g of methyltrichlorosilane in a 2 l three-neck flask. Subsequently, 1 g of trifluoromethanesulfonic acid was added. The mixture was heated to 80° C. and stirred for three hours. Thereafter, the mixture was cooled down to 30° C., and 6 g of water were added. This was followed by heating to 80° C. and stirring at a pressure of 150 mbar for a further 3 h. Chemical characterization was effected via determination of the acid value. The measurement unit is reported in acid equivalents per kg of chlorosiloxane. The acid value was 2.19 mol/kg.

b) Preparation of Polyether Siloxane

An initial charge of 455 g of a polyether of the general formula $CH_3CH_2CH_2CH_2O(CH_2CH_2O)_{32}(CH_2CH(CH_3)O)_{32}H$ was heated to 50° C. Subsequently, 50 g of the chlorosiloxane prepared in a) was added and the mixture was stirred for 30 minutes. Ammonia was gradually introduced up to a pH of 9. A white precipitate (ammonium chloride) precipitates out. Thereafter, the volatile constituents are removed under reduced pressure and stabilized with 1 m % of diisopropanolamine.

Example 6 a) Preparation of an SiOC-Bonded Polyether Siloxane Having Branching in the Siloxane Moiety To an initial charge of 88.0 g of a polyether having the general formula $CH_3CH_2CH_2CH_2O(CH_2CH_2O)_{32}(CH_2CH(CH_3)O)_{32}H$ in a 250 ml three-neck flask were added 100 g of ethyl acetate and 9.5 g of the acetoxy-functional siloxane prepared in Example 3 a). The mixture was stirred with the aid of a precision glass stirrer. Subsequently, $NH_3$ gas was introduced gradually until the reaction solution had a pH of 7 to 8. A white solid precipitated out. The mixture was heated to 50° C., stirred for a further 30 min and then filtered. The clear filtrate was then freed of volatiles at 130° C. and a pressure of 1 mbar.

Production of the Polyurethane Foams

In the performance tests, typical formulations for polyurethane foams of the following compositions were used:

TABLE 1

Formulation I for TDI80 flexible slabstock foam applications (20 kg/m³)

| Formulation I | Parts by mass (pphp) |
|---|---|
| Arcol ® 1107[1] | 100 |
| Desmodur ® T 80[2] Index <115> | 64.2 |
| Water | 5 |
| Methylene chloride | 5 |
| TEGOAMIN ® 33[3] | 0.15 |
| KOSMOS ® 29[4] | 0.25 |
| Foam stabilizer[5] | 2.0 |

[1] Available from Covestro, a glycerol-based polyether polyol having an OH number of 48 mg KOH/g.
[2] Tolylene diisocyanate T 80 (80% 2,4 isomer, 20% 2,6 isomer) from Covestro, 3 mPa · s, 48% NCO, functionality 2.
[3] Amine catalyst from Evonik Industries AG.
[4] Tin catalyst, obtainable from Evonik Industries AG: tin(II) salt of 2-ethylhexanoic acid.
[5] Foam stabilizers used are the inventive additives described in Examples 1 to 4 and 6 and the noninventive polyether-modified polysiloxane described in Example 5.

TABLE 2

Formulation II for TDI80 flexible slabstock foam applications (25 kg/m³)

| Formulation II | Parts by mass (pphp) |
|---|---|
| Arcol ® 1107[1] | 100 |
| Desmodur ® T 80[2] Index <105> | 48.3 |
| Water | 4 |
| TEGOAMIN ® DMEA[3] | 0.15 |
| KOSMOS ® 29[4] | 0.22 |
| Foam stabilizer[5] | 2.0 |

[1] Available from Covestro, a glycerol-based polyether polyol having an OH number of 48 mg KOH/g.
[2] Tolylene diisocyanate T 80 (80% 2,4 isomer, 20% 2,6 isomer) from Covestro, 3 mPa · s, 48% NCO, functionality 2.
[3] Amine catalyst, available from Evonik Industries AG.
[4] Tin catalyst, available from Evonik Industries AG: tin(II) salt of 2-ethylhexanoic acid.
[5] Foam stabilizers used are the inventive additives described in Examples 1 to 4 and 6 and the noninventive polyether-modified polysiloxane described in Example 5.

TABLE 3

Formulation III for TDI80 flexible slabstock foam applications (24 kg/m³)

| Formulation III | Parts by mass (pphp) |
|---|---|
| Arcol ® 1107[1] | 25 |
| Rokopol ® M1170[6] | 75 |
| Desmodur ® T 80[2] Index <90> | 44.4 |
| Water | 4.5 |
| TEGOAMIN ® DMEA[3] | 0.05 |
| TEGOAMIN ® 33[3] | 0.12 |
| KOSMOS ® 29[4] | 0.08 |
| Foam stabilizer[5] | 2.0 |

[1]Available from Covestro, a glycerol-based polyether polyol having an OH number of 48 mg KOH/g.
[2]Tolylene diisocyanate T 80 (80% 2,4 isomer, 20% 2,6 isomer) from Covestro, 3 mPa · s, 48% NCO, functionality 2.
[3]Amine catalyst from Evonik Industries AG.
[4]Tin catalyst, available from Evonik Industries AG: tin(II) salt of 2-ethylhexanoic acid.
[5]Foam stabilizers used are the inventive additives described in Examples 1 to 4 and 6 and the noninventive polyether-modified polysiloxane described in Example 5.
[6]Available from PCC Rokita SA; a glycerol-based polyether polyol having an OH number of 34 mg KOH/g.

TABLE 5

Formulation IV for viscoelastic TDI80 flexible slabstock foam applications (52 kg/m³)

| Formulation IV | Parts by mass (pphp) |
|---|---|
| Rokopol ® vTec8020[7] | 92 |
| Rokopol ® M1170[6] | 8 |
| Desmodur ® T 80[2] Index <93> | 41.8 |
| Water | 1.3 |
| TEGOAMIN ® BDE[3] | 0.15 |
| TEGOAMIN ® 33[3] | 0.30 |
| KOSMOS ® 29[4] | 0.03 |
| ORTEGOL ® 204[8] | 1.6 |
| ORTEGOL ® VCO[9] | 0.7 |
| Foam stabilizer[5] | 0.7 |

[2]Tolylene diisocyanate T 80 (80% 2,4 isomer, 20% 2,6 isomer) from Covestro, 3 mPa · s, 48% NCO, functionality 2.
[3]Amine catalyst from Evonik Industries AG.
[4]Tin catalyst, available from Evonik Industries AG: tin(II) salt of 2-ethylhexanoic acid.
[5]Foam stabilizers used are the inventive additives described in Examples 1 to 4 and 6 and the noninventive polyether-modified polysiloxane described in Example 5.
[6]Available from PCC Rokita SA; a glycerol-based polyether polyol having an OH number of 34 mg KOH/g.
[7]Available from PCC Rokita SA; a polyether polyol having an OH number of 185 mg KOH/g.
[8]Crosslinker from Evonik Industries AG.
[9]Cell opener from Evonik Industries AG.

TABLE 6

Formulation V for viscoelastic MDI flexible slabstock foam applications (45 kg/m³)

| Formulation V | Parts by mass (pphp) |
|---|---|
| Desmophen 24WB03[10] | 70 |
| Desmophen 41WB01[11] | 30 |
| VORANATE ™ MDI 229[12] Index <81> | 60.5 |
| Water | 2.5 |
| TEGOAMIN ® BDE[3] | 0.20 |
| TEGOAMIN ® 33[3] | 0.25 |
| KOSMOS ® 29[4] | 0.10 |
| Benzyl alcohol | 5 |
| Foam stabilizer[5] | 0.8 |

[2]Tolylene diisocyanate T 80 (80% 2,4 isomer, 20% 2,6 isomer) from Covestro, 3 mPa · s, 48% NCO, functionality 2.
[3]Amine catalyst from Evonik Industries AG.
[4]Tin catalyst, available from Evonik Industries AG: tin(II) salt of 2-ethylhexanoic acid.
[5]Foam stabilizers used are the inventive additives described in Examples 1 to 4 and 6 and the noninventive polyether-modified polysiloxane described in Example 5.
[10]Available from Covestro; a polyether polyol having an OH number of 165 mg KOH/g.
[11]Available from Covestro; a glycerol-based polyether polyol having an OH number of 37 mg KOH/g.
[12]Polymeric MDI from DOW Chemical, 190 mPa · s, 31.1% NCO, functionality 2.7.

General Procedure for Production of the Foams

The polyurethane foams were produced as what are called handmade foams in the laboratory. The foams were produced at 22° C. and air pressure 762 mmHg according to the details which follow. Production of each of the polyurethane foams according to Formulations I and III was accomplished using 300 g of polyol, and production of each of the polyurethane foams according to Formulation II using 400 g of polyol. Production of each of the polyurethane foams according to Formulations IV and V was accomplished using 250 g of polyol. The other formulation constituents were adjusted correspondingly. In this context, for example, 1.0 part (1.0 pphp) of a component meant 1 g of this substance per 100 g of polyol.

For the foams according to Formulations I, II and III, a paper cup was initially charged with the tin catalyst tin(II) 2-ethylhexanoate, polyol, the water, the amine catalysts and the respective foam stabilizer, and the contents were mixed with a disc stirrer at 1000 rpm for 60 s. If used in the formulation, methylene chloride was added after 45 s. After the first stirring, the isocyanate was added and incorporated using the same stirrer at 2500 rpm for 7 s. In the course of this, the mixture in the cup started to foam. Consequently, directly after the end of stirring, it was poured into a paper-lined foaming box. This has a base area of 30×30 cm and a height of 30 cm.

For the foams according to Formulations IV and V, a paper cup was initially charged with the tin catalyst tin(II) 2-ethylhexanoate, polyol, the water, the amine catalysts, further additives if present, and the respective foam stabilizer, and the contents were mixed with a disc stirrer at 1000 rpm for 60 s. After the first stirring, the isocyanate was added and incorporated using the same stirrer at 1500 rpm for 7 s. In the course of this, the mixture in the cup started to foam. Consequently, directly after the end of stirring, it was poured into a foaming box. This has a base area of 17×17 cm and a height of 30 cm. On the outside, a PUR foam insulation of thickness 5 cm prevented excessively rapid cooling. On the inside, the box was lined with a plastic film in order to subsequently be able to remove the cured foam.

After being poured in, the foam rose up in the foaming box. In the ideal case, the foam blew off on attainment of the maximum rise height and then fell back slightly. This opened the cell membranes of the foam bubbles and an open-pore cell structure of the foam was obtained.

Performance Tests

The foams produced were rated on the basis of the following physical properties:

a) Foam settling after the end of the rise phase (=fall-back).

The fall-back, or the further rise, is found from the difference in the foam height after direct blow-off and after 3 minutes after foam blow-off. The foam height is measured at the maximum in the middle of the foam crest by means of a needle secured to a centimetre scale. A positive value here describes the settling of the foam after blow-off, a negative value correspondingly describes the further rise of the foam.

b) Foam height: The height of the freely risen foam formed after 3 minutes. Foam height is reported in centimetres (cm).

c) Rise time

The period of time between the end of mixing of the reaction components and the blow-off of the polyurethane foam.

d) Foam density

The determination is made, as described in DIN EN ISO 845:2009-10, by measurement of the apparent density. Foam density is reported in kg/m3.

e) Porosity

The air permeability of the foam was determined in accordance with DIN EN ISO 4638:1993-07 by a dynamic pressure measurement on the foam. The dynamic pressure measured was reported in mm water column, with the lower dynamic pressure values then characterizing the more open foam. The values were measured in the range from 0 to 300 mm. The dynamic pressure was measured by means of an apparatus comprising a nitrogen source, reducing valve with pressure gauge, flow regulating screw, wash bottle, flow meter, T-piece, applicator nozzle and a graduated glass tube filled with water. The applicator nozzle has an edge length of 100×100 mm, a weight of 800 g, an internal diameter of the outlet opening of 5 mm, an internal diameter of the lower applicator ring of 20 mm and an external diameter of the lower applicator ring of 30 mm.

The measurement is carried out by setting the nitrogen admission pressure to 1 bar by means of the reducing valve and setting the flow rate to 480 l/h (Formulations I-III) or 100 l/h (Formulations IV and V). The amount of water in the graduated glass tube is set so that no pressure differential is built up and none can be read off. For the measurement on the test specimen having dimensions of 250×250×50 mm, the applicator nozzle is laid onto the corners of the test specimen, flush with the edges, and also once onto the (estimated) middle of the test specimen (in each case on the side having the greatest surface area). The result is read off when a constant dynamic pressure has been established. Evaluation is effected by forming the average of the five measurements obtained.

f) Number of cells per cm (cell count): This is determined visually on a cut surface (measured to DIN EN 15702).

g) Compression hardness CLD, 40% to DIN EN ISO 3386-1:1997+A1:2010. The measured values are reported in kilopascals (kPa).

h) Tensile strength and elongation at break to DIN EN ISO 1798:2008. The measurements of tensile strength are reported in kilopascals (kPa), and those of elongation at break in percent (%).

i) Rebound resilience to DIN EN ISO 8307:2007. The measurements are reported in percent (%).

Compression Set

Five test specimens each of size 5 cm×5 cm×2.5 cm were cut out of the finished foams. The starting thickness was measured. Compression set was measured no earlier than 72 h after production in accordance with DIN EN ISO 1856:2018. The testing was effected by Method C, with determination of compression set at 80° C. by contrast with Method A. All other conditions were as described in Method A: The test specimens were placed between the plates of the deforming device and were compressed by 90% of their thickness (i.e. to 2.5 mm). Within 15 minutes, the test specimens were placed into an oven at 80° C. and left therein for 22 h. After this time, the apparatus was removed from the oven, the test specimens were removed from the apparatus within 1 min, and they were placed on a wood surface. After relaxation for 30 min, the thickness was measured again and the compression set was calculated:

$$DVR = (d_0 - d_r)/d_0 \times 100$$

Odor Testing of the Resulting Foams

The finished foams, produced according to Formulations I-V, were packed in odor-neutral plastic bags and stored under airtight conditions. For the odor assessment of the foam, cubes measuring 10 cm×10 cm×10 cm were cut out and transferred to jars with a volume of 1 l, from which the samples were smelled. The jars were closed with a screw lid. The odor test took place after storing the jars for 24 hours at 22° C.

The odor test was assessed by a panel of 13 trained odor testers. They were questioned here about the intensity of the odor; a low odor level was rated +, moderate odor ++, and high odor +++.

Results of the Foaming Operations

The foam stabilizers according to the invention from Examples 1 to 4 and 6 and the noninventive foam stabilizer described in Example 5 were tested in Formulations I-V. The results of the performance tests for the various formulations and the foam stabilizers used are shown in Tables 6 to 12.

TABLE 6

Foaming results and odor testing of the foams with use of different foam stabilizers according to Formulation I

| No. | Stabilizer | Rise time [s] | Rise height [cm] | Settling [cm] | Cell count [cm$^{-1}$] | Density [kg/m$^3$] | Tensile strength [kPa] | Ball rebound [%] | Compression hardness (CLD 40%) [kPa] | Porosity [mm] | Odor intensity (13 testers trained in olfactory testing) +++ | ++ | + |
|---|---|---|---|---|---|---|---|---|---|---|---|---|---|
| 1 | Ex. 1 [a)] | 82 | 29.9 | 1.2 | 14 | 20.5 | 79.8 | 39 | 4.3 | 7 | 0 | 7 | 6 |
| 2 | Ex. 2 [a)] | 85 | 29.7 | 1.1 | 14 | 20.1 | 79.9 | 35 | 4.7 | 16 | 0 | 0 | 13 |
| 3 | Ex. 3 [a)] | 83 | 30.1 | 0.9 | 14 | 19.8 | 77.5 | 37 | 4.2 | 12 | 1 | 6 | 6 |
| 4 | Ex. 4 [a)] | 82 | 29.9 | 1.1 | 14 | 20.2 | 74.6 | 38 | 4.3 | 9 | 0 | 2 | 11 |

TABLE 6-continued

Foaming results and odor testing of the foams with use of different foam stabilizers according to Formulation I

| No. | Stabilizer | Rise time [s] | Rise height [cm] | Settling [cm] | Cell count [cm$^{-1}$] | Density [kg/m$^3$] | Tensile strength [kPa] | Ball rebound [%] | Compression hardness (CLD 40%) [kPa] | Porosity [mm] | Odor intensity (13 testers trained in olfactory testing) | | |
|---|---|---|---|---|---|---|---|---|---|---|---|---|---|
| | | | | | | | | | | | +++ | ++ | + |
| 5 | Ex. 5 [b] | 81 | 30.2 | 1.0 | 14 | 20.1 | 75.2 | 37 | 4.0 | 8 | 8 | 5 | 0 |
| 6 | Ex. 6 [a] | 82 | 30.3 | 1.2 | 14 | 20.4 | 78.7 | 36 | 4.6 | 11 | 1 | 5 | 7 |

[a] Inventive foam stabilizers, prepared according to Examples 1-4 and 6
[b] Noninventive foam stabilizers, prepared according to Example 5

TABLE 7

Foaming results and odor testing of the foams with use of different foam stabilizers according to Formulation II

| No. | Stabilizer | Rise time [s] | Rise height [cm] | Settling [cm] | Cell count [cm$^{-1}$] | Density [kg/m$^3$] | Tensile strength [kPa] | Ball rebound [%] | Compression hardness (CLD 40%) [kPa] | Porosity [mm] | Odor intensity (13 testers trained in olfactory testing) | | |
|---|---|---|---|---|---|---|---|---|---|---|---|---|---|
| | | | | | | | | | | | +++ | ++ | + |
| 7 | Ex. 1 [a] | 96 | 31.1 | 0.6 | 14 | 25.5 | 90.2 | 39 | 4.0 | 15 | 1 | 8 | 4 |
| 8 | Ex. 2 [a] | 100 | 30.8 | 0.5 | 14 | 25.2 | 88.6 | 40 | 3.9 | 18 | 0 | 2 | 11 |
| 9 | Ex. 3 [a] | 101 | 30.5 | 0.4 | 14 | 24.9 | 89.4 | 42 | 4.3 | 22 | 1 | 7 | 5 |
| 10 | Ex. 4 [a] | 98 | 31.2 | 0.3 | 14 | 24.8 | 92.5 | 39 | 4.2 | 17 | 0 | 3 | 10 |
| 11 | Ex. 5 [b] | 100 | 30.7 | 0.6 | 14 | 25.8 | 90.5 | 40 | 4.0 | 20 | 11 | 2 | 0 |
| 12 | Ex. 6 [a] | 102 | 30.6 | 0.4 | 14 | 25.1 | 88.7 | 38 | 4.3 | 16 | 2 | 5 | 6 |

[a] Inventive foam stabilizers, prepared according to Examples 1-4 and 6
[b] Noninventive foam stabilizers, prepared according to Example 5

TABLE 8

Foaming results and odor testing of the foams with use of different foam stabilizers according to Formulation III

| No. | Stabilizer | Rise time [s] | Rise height [cm] | Settling [cm] | Cell count [cm$^{-1}$] | Density [kg/m$^3$] | Tensile strength [kPa] | Ball rebound [%] | Compression hardness (CLD 40%) [kPa] | Porosity [mm] | Odor intensity (13 testers trained in olfactory testing) | | |
|---|---|---|---|---|---|---|---|---|---|---|---|---|---|
| | | | | | | | | | | | +++ | ++ | + |
| 13 | Ex. 1 [a] | 149 | 19.8 | 0.2 | 14 | 23.1 | 120.3 | 45 | 1.5 | 3 | 3 | 9 | 1 |
| 14 | Ex. 2 [a] | 131 | 19.1 | 0.4 | 14 | 24.0 | 122.5 | 42 | 1.7 | 5 | 0 | 4 | 9 |
| 15 | Ex. 3 [a] | 144 | 19.7 | 0.2 | 14 | 24.3 | 110.8 | 43 | 1.6 | 7 | 2 | 7 | 4 |
| 16 | Ex. 4 [a] | 139 | 19.7 | 0.3 | 14 | 23.6 | 115.4 | 47 | 1.6 | 5 | 0 | 5 | 8 |
| 17 | Ex. 5 [b] | 142 | 19.4 | 0.2 | 14 | 24.1 | 118.3 | 43 | 1.7 | 5 | 12 | 1 | 0 |
| 18 | Ex. 6 [a] | 145 | 18.9 | 0.1 | 14 | 23.1 | 111.3 | 42 | 1.4 | 6 | 1 | 6 | 6 |

[a] Inventive foam stabilizers, prepared according to Examples 1-4 and 6
[b] Noninventive foam stabilizers, prepared according to Example 5

TABLE 9

Foaming results and odor testing of the foams with use of different foam stabilizers according to Formulation IV

| No. | Stabilizer | Rise time [s] | Rise height [cm] | Settling [cm] | Cell count [cm$^{-1}$] | Density [kg/m$^3$] | Tensile strength [kPa] | Ball rebound [%] | Compression hardness (CLD 40%) [kPa] | Porosity [mm] | Odor intensity (13 testers trained in olfactory testing) | | |
|---|---|---|---|---|---|---|---|---|---|---|---|---|---|
| | | | | | | | | | | | +++ | ++ | + |
| 19 | Ex. 1 [a] | 118 | 33.5 | 0.5 | 11 | 52.5 | 67.4 | 3 | 1.9 | 80 | 0 | 6 | 7 |
| 20 | Ex. 2 [a] | 117 | 33.4 | 0.7 | 10 | 52.0 | 70.3 | 4 | 2.2 | 68 | 0 | 1 | 12 |
| 21 | Ex. 3 [a] | 113 | 35.0 | 0.8 | 11 | 52.3 | 60.4 | 3 | 2.4 | 77 | 1 | 5 | 7 |
| 22 | Ex. 4 [a] | 114 | 34.9 | 0.4 | 11 | 53.0 | 68.2 | 5 | 2.0 | 90 | 0 | 2 | 11 |

TABLE 9-continued

Foaming results and odor testing of the foams with use of different foam stabilizers according to Formulation IV

| No. | Stabilizer | Rise time [s] | Rise height [cm] | Settling [cm] | Cell count [cm$^{-1}$] | Density [kg/m$^3$] | Tensile strength [kPa] | Ball rebound [%] | Compression hardness (CLD 40%) [kPa] | Porosity [mm] | Odor intensity (13 testers trained in olfactory testing) +++ | ++ | + |
|---|---|---|---|---|---|---|---|---|---|---|---|---|---|
| 23 | Ex. 5 [b] | 117 | 35.2 | 0.6 | 10 | 52.9 | 65.1 | 5 | 2.1 | 70 | 7 | 6 | 0 |
| 24 | Ex. 6 [a] | 113 | 33.5 | 0.4 | 11 | 53.1 | 68.7 | 4 | 2.2 | 92 | 1 | 4 | 8 |

[a] Inventive foam stabilizers, prepared according to Examples 1-4 and 6
[b] Noninventive foam stabilizers, prepared according to Example 5

TABLE 10

Foaming results and odor testing of the foams with use of different foam stabilizers according to Formulation V

| No. | Stabilizer | Rise time [s] | Rise height [cm] | Settling [cm] | Cell count [cm$^{-1}$] | Density [kg/m$^3$] | Tensile strength [kPa] | Ball rebound [%] | Compression hardness (CLD 40%) [kPa] | Porosity [mm] | Odor intensity (13 testers trained in olfactory testing) +++ | ++ | + |
|---|---|---|---|---|---|---|---|---|---|---|---|---|---|
| 25 | Ex. 1 [a] | 160 | 35.6 | 3.0 | 12 | 45.5 | 96.6 | 5 | 2.9 | 5 | 1 | 9 | 3 |
| 26 | Ex. 2 [a] | 162 | 36.7 | 3.2 | 13 | 45.7 | 115.3 | 4 | 2.7 | 5 | 0 | 3 | 10 |
| 27 | Ex. 3 [a] | 165 | 36.3 | 3.1 | 12 | 45.4 | 95.3 | 5 | 3.1 | 9 | 1 | 6 | 6 |
| 28 | Ex. 4 [a] | 168 | 35.5 | 2.9 | 12 | 44.8 | 110.2 | 7 | 2.9 | 8 | 0 | 3 | 10 |
| 29 | Ex. 5 [b] | 162 | 37.0 | 3.3 | 13 | 45.8 | 103.4 | 6 | 3.0 | 5 | 10 | 3 | 0 |
| 30 | Ex. 6 [a] | 170 | 35.6 | 3.0 | 13 | 44.5 | 98.6 | 5 | 2.9 | 8 | 0 | 7 | 6 |

[a] Inventive foam stabilizers, prepared according to Examples 1-4 and 6
[b] Noninventive foam stabilizers, prepared according to Example 5

As shown by Tables 6 to 10, the foam stabilizers obtained according to Examples 1 to 4 and 6 were usable for production of various typical formulations (I-V) for flexible slabstock foam. The open cell content and cell count of the flexible foams and the physical measurements, for example tensile strength, hardness, density and ball rebound, are unaffected by comparison with the noninventive foam stabilizer according to Example 5. As likewise shown by Tables 6 to 10, however, the intensity of the odor of the foams that have been produced with the stabilizers from Examples 1-4 and 6 is lower throughout than the odor of the foams that have been produced with the noninventive foam stabilizer from Example 5. A clear majority of the testers classifies the samples according to the invention here as odor-neutral (foam stabilizers according to Examples 2 and 4) or as having distinctly lower odor (Examples 1 and 3). The odor test was repeated twice more by the testers, and the aforementioned results were confirmed in precisely the same way. It is clear from the results that the testers assessed the foams that were produced with a foam stabilizer according to the invention as being less intensely odorous.

TABLE 11

Ageing of the foams using the example of determination of compression set with use of various foam stabilizers according to Formulation I

| No. | Stabilizer | Compression set 90%, 22 h at 80° C. |
|---|---|---|
| 31 | Ex. 1 [a] | 27 |
| 32 | Ex. 2 [a] | 32 |
| 33 | Ex. 3 [a] | 23 |
| 34 | Ex. 4 [a] | 35 |

TABLE 11-continued

Ageing of the foams using the example of determination of compression set with use of various foam stabilizers according to Formulation I

| No. | Stabilizer | Compression set 90%, 22 h at 80° C. |
|---|---|---|
| 35 | Ex. 5 [b] | 55 |
| 36 | Ex. 6 [a] | 18 |

[a] Inventive foam stabilizers, prepared according to Examples 1-4 and 6
[b] Noninventive foam stabilizers, prepared according to Example 5

TABLE 12

Ageing of the foams using the example of determination of compression set with use of various foam stabilizers according to Formulation II

| No. | Stabilizer | Compression set 90%, 22 h at 80° C. |
|---|---|---|
| 37 | Ex. 1 [a] | 25 |
| 38 | Ex. 2 [a] | 44 |
| 39 | Ex. 3 [a] | 31 |
| 40 | Ex. 4 [a] | 38 |
| 41 | Ex. 5 [b] | 58 |
| 42 | Ex. 6 [a] | 26 |

[a] Inventive foam stabilizers, prepared according to Examples 1-4 and 6
[b] Noninventive foam stabilizers, prepared according to Example 5

As shown by Tables 11 and 12, the flexible foams produced with the foam stabilizers according to the invention have better ageing properties than the flexible foams produced with the noninventive foam stabilizer from Example 5. Ageing was examined here using the example of compression set after compression to 90% of the original height and storage in an oven at 80° C. for 22 h. A lower compression set means that the test specimens after relaxation for 30 min came closer to the original height of about 2.5 cm, which equates to better ageing resistance. Particularly the foam stabilizers obtained according to Examples 1, 3 and 6 lead to distinctly more ageing-resistant flexible foams.

Furthermore, it was found that the use of the foam stabilizers according to the invention in the other above-mentioned formulations also led to foams of distinctly greater ageing resistance. These likewise had distinctly lower compression sets.

The invention claimed is:

1. A process for producing a polyurethane foam (PU) foam by reacting
   (a) at least one polyol component with
   (b) at least one isocyanate component
   in the presence of
   (c) one or more catalysts, which catalyse the isocyanate-polyol and/or isocyanate-water reactions and/or isocyanate trimerization, and
   (d) optionally one or more chemical or physical blowing agents,
   with use of
   (e) SiOC-bonded polyether siloxanes having branching in the siloxane moiety, prepared from (f) branched end-equilibrated siloxanes bearing acetoxy groups,
   wherein a sufficient amount of the SiOC-bonded polyether siloxane (e) having branching in the siloxane moiety is added that the proportion by mass of the SiOC-bonded polyether siloxane (e) based on the finished PU foam is from 0.0001% to 10% by weight.

2. The process according to claim 1, wherein the PU foam is a rigid PU foam, a flexible PU foam, a viscoelastic PU foam, an HR PU foam, a hypersoft PU foam, a semirigid PU foam, a thermoformable PU foam or an integral PU foam.

3. The process according to claim 1, wherein the reaction is effected with use of
   g) water, and/or
   h) one or more organic solvents, and/or
   i) one or more stabilizers against oxidative degradation, and/or
   j) one or more flame retardants, and/or
   k) further foam stabilizers other than component (e), based on siloxanes and/or polydialkylsiloxane-polyoxyalkylene copolymers,
   and/or
   l) one or more further additives, selected from the group of the surfactants, biocides, dyes, pigments, fillers, antistatic additives, crosslinkers, chain extenders, cell openers and fragrances.

4. The process according to claim 1, wherein the branched end-equilibrated siloxanes (f) bearing acetoxy groups are obtained from the reaction of iv) silanes and/or siloxanes bearing alkoxy groups, and/or
   v) silanes and/or siloxanes bearing hydroxy groups, and/or
   vi) simple siloxane cycles and/or DT cycles,
   with acetic anhydride, superacid, trifluoromethanesulfonic acid, or acetic acid.

5. The process according to claim 1, wherein the branched end-equilibrated siloxanes (f) bearing acetoxy groups are prepared using a silane and/or siloxane bearing alkoxy groups and containing at least one T and/or Q group, and/or DT cycles.

6. The process according to claim 1, wherein the SiOC-bonded polyether siloxanes (e) branched in the siloxane moiety are prepared by reacting the branched end-equilibrated siloxanes (f) bearing acetoxy groups with polyetherols.

7. The process according to claim 6, wherein the reaction specified therein of the branched end-equilibrated siloxanes (f) bearing acetoxy groups with polyetherols using an inert solvent is effected using a solvent that is inert and at the same time forms an azeotrope with acetic acid formed and possibly already present.

8. The process according to claim 6, wherein the reaction specified therein of the branched end-equilibrated siloxanes (f) bearing acetoxy groups with polyetherols is effected in a solvent-free manner.

9. The process according to claim 1, wherein the branched end-equilibrated siloxanes (f) bearing acetoxy groups are reacted with polyetherols in the presence of at least one base.

10. The process according to claim 1, wherein the SiOC-bonded polyether siloxane (e) having branching in the siloxane moiety contains polyether residues, having the following formula (III):

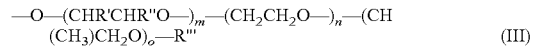

—O—(CHR'CHR''O—)$_m$—(CH$_2$CH$_2$O—)$_n$—(CH(CH$_3$)CH$_2$O)$_o$—R'''     (III)

with
R' is hydrogen, a saturated alkyl group having 1-18 carbon atoms or an aromatic radical,
R'' is hydrogen, a saturated alkyl group having 1-18 carbon atoms or an aromatic radical,
R''' is identical or different, saturated or unsaturated alkyl radicals having 1-18 carbon atoms,
m=from 0 up to 250,
n=from 0 up to 250,
o=from 0 up to 250,
wherein the sum total of m, n and o is equal to or greater than 3.

11. The process according to claim 1, wherein the branched end-equilibrated siloxanes (f) bearing acetoxy groups are reacted with polyetherols in the presence of sodium hydrogencarbonate, ammonia, or an organic amine.

12. The process according to claim 10, wherein
R' is a methyl or ethyl group or a phenyl radical,
R'' is a methyl or ethyl group or a phenyl radical,
R''' is identical or different, saturated or unsaturated alkyl radicals having 1-4 carbon atoms,
m=from 0 up to 50,
n=from 5 up to 50,
o=from 5 up to 50.

* * * * *